United States Patent
Lai et al.

(10) Patent No.: US 11,914,860 B2
(45) Date of Patent: Feb. 27, 2024

(54) DATA STORAGE FOR ARTIFICIAL INTELLIGENCE-BASED APPLICATIONS

(71) Applicant: Macronix International Co., Ltd., Hsinchu (TW)

(72) Inventors: Chun-Hung Lai, Hsinchu (TW); Hung-Sheng Chang, Taipei (TW)

(73) Assignee: Macronix International Co., Ltd., Hsinchu (TW)

( * ) Notice: Subject to any disclaimer, the term of this patent is extended or adjusted under 35 U.S.C. 154(b) by 1331 days.

(21) Appl. No.: 15/999,604

(22) Filed: Aug. 20, 2018

(65) Prior Publication Data

US 2020/0057561 A1  Feb. 20, 2020

(51) Int. Cl.
*G06F 3/06* (2006.01)
*G06N 3/063* (2023.01)

(52) U.S. Cl.
CPC .......... *G06F 3/0604* (2013.01); *G06F 3/0655* (2013.01); *G06F 3/0679* (2013.01); *G06N 3/063* (2013.01)

(58) Field of Classification Search
USPC .......................................................... 706/15
See application file for complete search history.

(56) References Cited

U.S. PATENT DOCUMENTS

| | | | | |
|---|---|---|---|---|
| 11,048,583 B1* | 6/2021 | Hokenmaier | ....... | G06F 11/1048 |
| 2011/0078496 A1* | 3/2011 | Jeddeloh | ............. | G06F 11/1028 |
| | | | | 714/E11.062 |
| 2011/0271037 A1* | 11/2011 | Oh | ......... | G06F 3/0607 |
| | | | | 711/170 |
| 2012/0246394 A1* | 9/2012 | Ou | ....... | G06F 12/0246 |
| | | | | 711/E12.008 |
| 2013/0262793 A1* | 10/2013 | Naethke | ................ | G06F 9/3887 |
| | | | | 711/E12.001 |
| 2013/0311849 A1* | 11/2013 | Miyachi | .................. | G11C 16/08 |
| | | | | 714/758 |
| 2016/0322042 A1* | 11/2016 | Vlietinck | .................. | G06N 3/08 |
| 2017/0153819 A1* | 6/2017 | Zeng | ...................... | G06F 3/0619 |
| 2017/0277628 A1* | 9/2017 | Paul | ........................ | G06F 12/06 |

(Continued)

FOREIGN PATENT DOCUMENTS

| | | | | |
|---|---|---|---|---|
| CN | 105740946 | | 7/2016 | |
| CN | 110825311 A | * | 2/2020 | ........... G06F 3/0655 |

*Primary Examiner* — Yaima Rigol
*Assistant Examiner* — Elias Young Kim
(74) *Attorney, Agent, or Firm* — Fish & Richardson P.C.

(57) ABSTRACT

A processor receives, from an input device, input data for processing. Upon determining that the input data corresponds to an artificial intelligence (AI) application, the processor generates an AI command for performing read or write operations for a memory device that is configured to store data for a plurality of applications including the AI application, the AI command characterized by an operational code and including information about one or more components of the AI application corresponding to the input data. The processor sends the AI command and the input data to a storage controller managing the memory device, wherein the read or write operations for the memory device are performed by the storage controller using the operational code and the information included in the AI command. The processor receives, from the storage controller, a result of the read or write operations performed on the memory device.

27 Claims, 11 Drawing Sheets

(56) References Cited

U.S. PATENT DOCUMENTS

| | | | |
|---|---|---|---|
| 2018/0024964 A1 | 1/2018 | Mao et al. | |
| 2018/0074718 A1* | 3/2018 | Lee | G06F 3/0688 |
| 2019/0026048 A1* | 1/2019 | Muehge | G06F 3/0685 |
| 2019/0035460 A1* | 1/2019 | Terada | G11C 13/004 |
| 2019/0361811 A1* | 11/2019 | Saeki | G06N 7/00 |

* cited by examiner

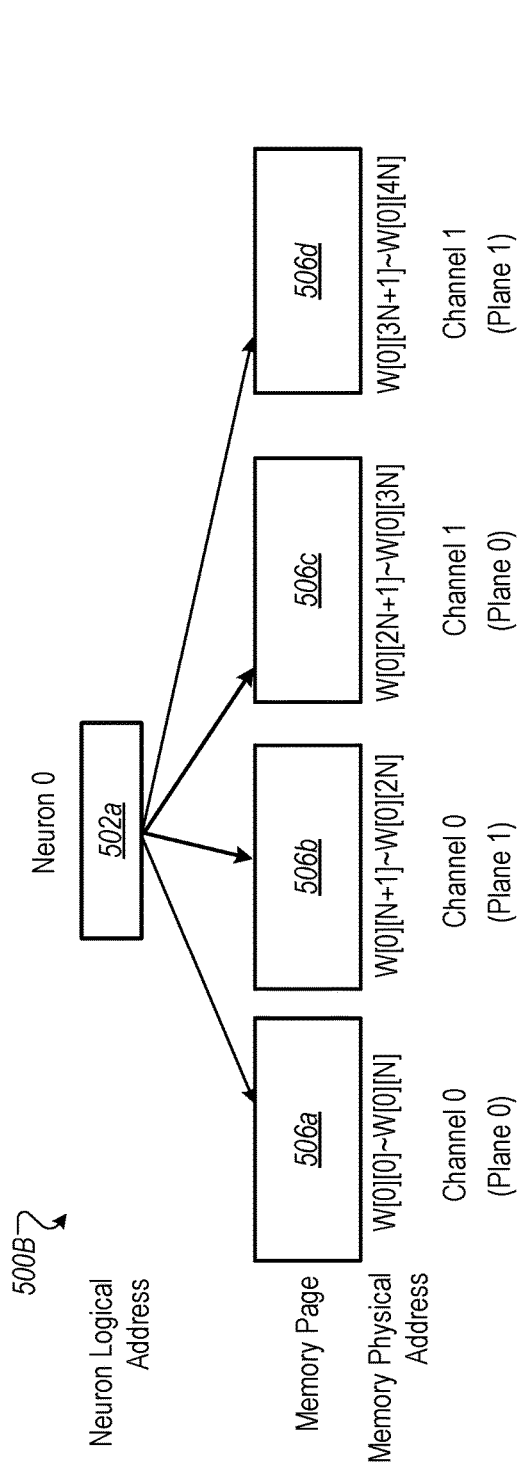
FIG. 5B
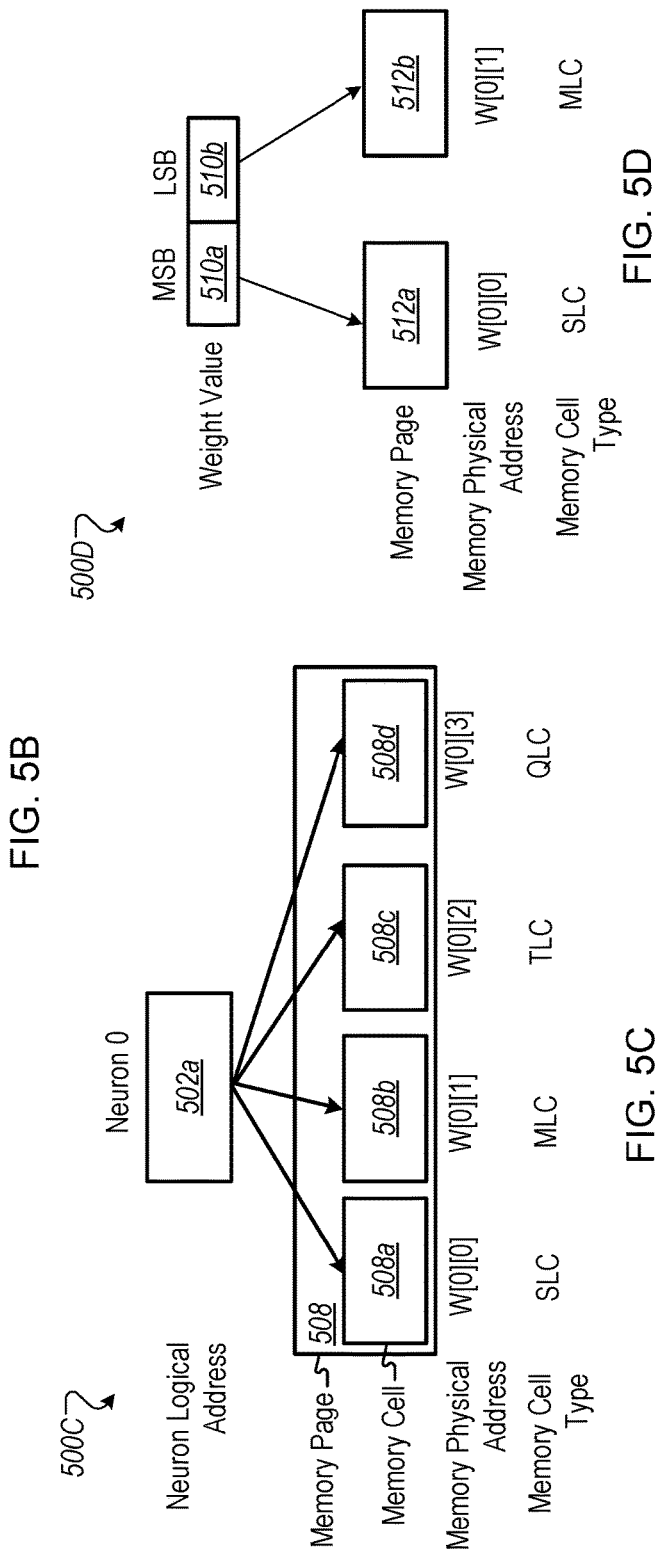
FIG. 5C
FIG. 5D

DATA STORAGE FOR ARTIFICIAL INTELLIGENCE-BASED APPLICATIONS

TECHNICAL FIELD

The following disclosure relates generally to apparatus, systems and methods for data storage for artificial intelligence-based applications.

BACKGROUND

Storage controllers (also referred to as memory controllers) of some memory storage devices use file-based management to manage data storage in the memory devices. Such storage controllers employ a file/flash translation layer (FTL) to map logical block addresses of applications to physical block addresses of the respective memory devices.

SUMMARY

The present disclosure describes apparatus, systems and methods to manage access to data for artificial intelligence (AI)-based applications stored in a memory storage device. In some implementations, the memory device includes a storage controller for managing access to the memory device storage by one or more processors that are coupled to the memory device. A processor sends, to the storage controller, commands for accessing a memory location in the memory device storage, such as a read command, or a write command, or both. A command can be to access data for AI applications, or for non-AI applications (latter also referred to as regular applications). For a non-AI application command (also referred to as a non-AI command), the storage controller loads the target memory pages or memory blocks for direct access by the processor. For an AI application command (also referred to as an AI command), the storage controller performs the access operation locally at the memory device and sends results of the operation back to the processor.

In performing the access operation for the AI command locally, the storage controller utilizes various optimizations that are suited to the unique structure of AI application data (AI data). For example, in some implementations, the AI application corresponds to an artificial neural network (ANN). In some of these implementations, the storage controller stores the bits of AI data, e.g., weights for a specific neuron of the ANN, on a same page of the memory device storage. Alternatively, the storage controller divides the weights into groups, and stores each group in a same page, with different groups in different pages. In some of these implementations, the most significant bits (MSBs) of the data representing the weights are more important than the least significant bits (LSBs) of the data; in such cases, the storage controller stores the MSBs in single level cells (SLCs) and stores the LSBs in multi-level cells (MLCs), triple-level cells (TLCs), or quad-level cells (QLCs). Additionally or alternatively, the storage controller stores the MSBs with error correcting code (ECC) values that are greater than ECC values used for the LSBs. In some implementations, some neurons of an ANN are more important than other neurons of the ANN. In such cases, the storage controller stores the weights for important neurons in SLCs, while weights for other neurons are stored in MLCs, TLCs or QLCs. In some implementations, the storage controller replicates important weights for a neuron across multiple memory pages for redundancy. In some implementations, the storage controller stores frequently accessed neurons in a logging area of the memory device storage, while storing other neurons in regular storage (e.g., non-logging areas of the memory device storage).

In a general aspect, an apparatus comprises one or more processors and non-transitory media storing instructions. The instructions, when executed by the one or more processors, are configured to cause the one or more processors to perform the following operations. The one or more processors receive, from an input device, input data for processing. Conditioned on determining that the input data corresponds to an artificial intelligence (AI) application, the one or more processors generate an AI command for performing one or more read or write operations for a memory device that is configured to store data for a plurality of applications processed by the one or more processors, the plurality of applications including the AI application, the AI command characterized by an operational code and including information about one or more components of the AI application corresponding to the input data. The one or more processors send the AI command and the input data to a storage controller managing the memory device, wherein the one or more read or write operations for the memory device is performed by the storage controller using the operational code and the information included in the AI command. The one or more processors receive, from the storage controller, a result of the one or more read or write operations performed on the memory device.

Particular implementations may include one or more of the following features. Conditioned on determining that the input data corresponds to a non-AI application included in the plurality of applications, the one or more processors may access one or more memory locations corresponding to the input data in the memory device, and may perform one or more read or write operations on the accessed one or more memory locations.

The one or more components of the AI application may include one or more neurons in an artificial neural network. The input data may include weights corresponding to one or more of input connections or output connections of each of the one or more neurons. The operational code may correspond to one of (i) an individual read or write of a particular neuron in the artificial neural network, (ii) multiple individual reads or writes of a plurality of neurons in the artificial neural network, or (iii) a batch read or write of a batch of neurons in the artificial neural network.

The apparatus of claim 3 may further include the storage controller that may be configured to perform the following operations. Upon receiving the AI command from the one or more processors, the storage controller may obtain, from the information included in the AI command, a set of weights corresponding to one or more of input connections or output connections of a first neuron of the one or more neurons. The storage controller may associate the set of weights with the first neuron. In response to associating the set of weights with the first neuron, the storage controller may store in a particular page or block of the memory device, the set of weights associated with the first neuron, wherein the particular page of the memory device is configured to store weights associated with the first neuron.

In response to associating the set of weights with the first neuron, the storage controller may divide the set of weights into a first subset and a second subset. The storage controller may store the first subset in a same page or block in a first channel of the memory device, and store the second subset in a same page or block in a second channel of the memory device.

Upon receiving the AI command from the one or more processors, the storage controller may obtain, from the information included in the AI command, a set of weights corresponding to one or more of input connections or output connections of a first neuron of the one or more neurons. The storage controller may determine that a first weight of the set of weights has a first importance value and a second weight of the set of weights has a second importance value, wherein the second importance value is less than the first importance value. In response to the determination, the storage controller may store the first weight in a single level cell (SLC) in a first page of the memory device, and store the second weight in one of a multi-level cell (MLC), a triple-level cell (TLC), or a quad-level cell (QLC) in a second page of the memory device.

The storage controller may determine that a first weight of the set of weights has a first importance value and a second weight of the set of weights has a second importance value, wherein the second importance value is less than the first importance value. In response to the determination, the storage controller may store the first weight in a page or block of the memory device, and replicate the first weight in at least one additional page of the memory device, and may store the second weight in a page or block of the memory device without replication.

Upon receiving the AI command from the one or more processors, the storage controller may further obtain, a second set of weights of one or more of input connections or output connections of a second neuron of the one or more neurons. The storage controller may determine that the first neuron is accessed more frequently than the second neuron, and that the second neuron is accessed at a same rate as other neurons of the one or more neurons. In response to the determination, the storage controller may store the first set of weights in a first area of the memory device that is used for logging, and store the second set of weights in a second area of the memory device that is used for long-term storage different from logging.

The storage controller may determine that a first weight of the set of weights has a particular importance value. The storage controller may compare the particular importance value to a threshold importance value. Conditioned on a result of the comparison indicating that the particular importance value is greater than or equal to the threshold importance value, the storage controller may perform a full error correction check as part of the one or more read or write operations for the first weight. Conditioned on a result of the comparison indicating that the particular importance value is less than the threshold importance value, the storage controller may perform a partial error correction check as part of the one or more read or write operations for the first weight, wherein the partial error correction check is performed on one of the most significant bits corresponding to the first weight, or the least significant bits corresponding to the first weight.

The storage controller may determine a first portion and a second portion of each weight of the set of weights, wherein the first portion and the second portion of each weight may correspond respectively to a first section and a second section of information bits corresponding to the weight, the first section and the second section characterized by corresponding relative importance values. The storage controller may store the first portions of the weights in the set of weights in a first page of the memory device, and may store the second portions of the weights in the set of weights in a second page of the memory device, wherein a first error check capability and a different second error check capability corresponds to the first page and the second page respectively.

The storage controller may determine a first portion and a second portion of each weight of the set of weights, wherein the first portion and the second portion of each weight may correspond respectively to a first section and a second section of information bits corresponding to the weight, the first section and the second section characterized by corresponding relative importance values. The storage controller may store the first portions of the weights in the set of weights in a first block of the memory device, and store the second portions of the weights in the set of weights in a second block of the memory device, wherein a number of program/erase cycles corresponding to the first block may be different from a number of program/erase cycles corresponding to second first block.

The memory device may include at least a first partition for storing data corresponding to AI applications included in the plurality of applications, and a second partition for storing data corresponding to non-AI applications included in the plurality of applications.

The memory device may include one of a non-volatile memory (NVM) storage, a universal flash storage (UFS), a peripheral component interconnect express (PCIe) storage, a phase-change memory (PCM), a resistive random-access memory (ReRAM), a magnetoresistive random-access memory (MRAM), a dynamic random-access memory, a magnetic disk, or an optical disk.

In another aspect, a system includes one or more processors and one or more storage controllers, wherein each storage controller of the one or more storage controllers manages a different memory device of one or more memory devices. Each processor of the one or more processors is configured to perform the following operations. The processor receives, from an input device, input data for processing. Conditioned on determining that the input data corresponds to an artificial intelligence (AI) application, the processor generates an AI command for performing one or more read or write operations for a memory device that is configured to store data for a plurality of applications processed by the one or more processors, the plurality of applications including the AI application, the AI command characterized by an operational code and including information about one or more components of the AI application corresponding to the input data. The processor sends the AI command and the input data to a storage controller managing the memory device, wherein the one or more read or write operations for the memory device is performed by the storage controller using the operational code and the information included in the AI command. The processor receives, from the storage controller, a result of the one or more read or write operations performed on the memory device. The one or more components of the AI application include one or more neurons in an artificial neural network, and the input data includes weights corresponding to one or more of input connections or output connections of each of the one or more neurons. Conditioned on determining that the input data corresponds to a non-AI application included in the plurality of applications, the processor accesses one or more memory locations corresponding to the input data in the memory device, and performs one or more read or write operations on the accessed one or more memory locations.

Each storage controller of the one or more storage controllers is configured to perform the following operations. Upon receiving an AI command and input data from a processor of the one or more processors, the storage controller obtains, from the information included in the AI command, a set of weights corresponding to one or more of input connections or output connections of a first neuron of the one or more neurons. The storage controller associates the set of weights with the first neuron. In response to associating the set of weights with the first neuron, the storage controller performs a memory access operation involving the set of weights associated with the first neuron on a corresponding memory device.

Particular implementations may include one or more of the following features. The operational code may correspond to one of (i) an individual read or write of a particular neuron in the artificial neural network, (ii) multiple individual reads or writes of a plurality of neurons in the artificial neural network, or (iii) a batch read or write of a batch of neurons in the artificial neural network.

Performing the memory access operation may include storing in a particular page or block of the memory device, the set of weights associated with the first neuron, wherein the particular page of the memory device is configured to store weights associated with the first neuron.

Performing the memory access operation may include dividing the set of weights into a first subset and a second subset. The storage controller may store the first subset in a same page or block in a first channel of the memory device, and store the second subset in a same page or block in a second channel of the memory device.

Performing the memory access operation may include determining that a first weight of the set of weights has a first importance value and a second weight of the set of weights has a second importance value, wherein the second importance value is less than the first importance value. In response to the determination, the storage controller may store the first weight in a single level cell (SLC) in a first page of the memory device, and store the second weight in one of a multi-level cell (MLC), a triple-level cell (TLC), or a quad-level cell (QLC) in a second page of the memory device.

Performing the memory access operation may include determining that a first weight of the set of weights has a first importance value and a second weight of the set of weights has a second importance value, wherein the second importance value is less than the first importance value. In response to the determination, the storage controller may store the first weight in a page or block of the memory device, and replicate the first weight in at least one additional page of the memory device, and may store the second weight in a page or block of the memory device without replication.

Upon receiving the AI command from the one or more processors, the storage controller may further obtain, a second set of weights of one or more of input connections or output connections of a second neuron of the one or more neurons. The storage controller may determine that the first neuron is accessed more frequently than the second neuron, and that the second neuron is accessed at a same rate as other neurons of the one or more neurons. In response to the determination, the storage controller may store the first set of weights in a first area of the memory device that is used for logging, and store the second set of weights in a second area of the memory device that is used for long-term storage different from logging.

Performing the memory access operation may include determining that a first weight of the set of weights has a particular importance value. The storage controller may compare the particular importance value to a threshold importance value. Conditioned on a result of the comparison indicating that the particular importance value is greater than or equal to the threshold importance value, the storage controller may perform a full error correction check as part of the one or more read or write operations for the first weight. Conditioned on a result of the comparison indicating that the particular importance value is less than the threshold importance value, the storage controller may perform a partial error correction check as part of the one or more read or write operations for the first weight, wherein the partial error correction check is performed on one of the most significant bits corresponding to the first weight, or the least significant bits corresponding to the first weight.

Performing the memory access operation may include determining a first portion and a second portion of each weight of the set of weights, wherein the first portion and the second portion of each weight may correspond respectively to a first section and a second section of information bits corresponding to the weight, the first section and the second section characterized by corresponding relative importance values. The storage controller may store the first portions of the weights in the set of weights in a first page of the memory device, and may store the second portions of the weights in the set of weights in a second page of the memory device, wherein a first error check capability and a different second error check capability corresponds to the first page and the second page respectively.

Performing the memory access operation may include determining a first portion and a second portion of each weight of the set of weights, wherein the first portion and the second portion of each weight may correspond respectively to a first section and a second section of information bits corresponding to the weight, the first section and the second section characterized by corresponding relative importance values. The storage controller may store the first portions of the weights in the set of weights in a first block of the memory device, and store the second portions of the weights in the set of weights in a second block of the memory device, wherein a number of program/erase cycles corresponding to the first block may be different from a number of program/erase cycles corresponding to second first block.

Each memory device of the system may include at least a first partition for storing data corresponding to AI applications included in the plurality of applications, and a second partition for storing data corresponding to non-AI applications included in the plurality of applications.

Each memory device of the system may include one of a non-volatile memory (NVM) storage, a universal flash storage (UFS), a peripheral component interconnect express (PCIe) storage, a phase-change memory (PCM), a resistive random-access memory (ReRAM), a magnetoresistive random-access memory (MRAM), a dynamic random-access memory, a magnetic disk, or an optical disk.

Implementations of the above techniques also include methods, computer program products and computer-readable media. One such method includes one or more processors and one or more storage controllers of memory devices performing the above-described actions. One such computer program product is suitably embodied in a non-transitory machine-readable medium that stores instructions executable by one or more processors. The instructions are configured to cause the one or more processors to perform the above-described actions. One such computer-readable medium stores instructions that, when executed by one or more processors, are configured to cause the one or more processors to perform the above described actions.

Using the novel features described above and in the following sections of this specification, a memory device can provide efficient storage for AI applications. By enabling the storage controller of the memory device to perform access operations for AI data locally on the memory device, operations performed by a host processor, e.g., a central processing unit (CPU) or graphical processing unit (GPU), can be amortized. In doing so, loading on the CPU or the GPU, or both, can be released, and movement of data between the CPU or GPU and storage can be reduced. This is advantageous for AI applications, which rely on amounts of data in small size units (e.g., 4-byte data unit sizes), for AI inference and training.

The system performance can be improved, e.g., achieve speedier access to AI data, by adapting the storage controller to support a neuron-based mapping table design, which maps neurons of an ANN to physical block address (PBA) or physical page address (PPA) of the memory device. Such a mapping, including the disclosed logging mechanism, supports access flows specific to AI data, which can exhibit a high locality feature, e.g., some data are accessed more frequently than other data. The system performance can also be improved by enabling more reliable data storage, e.g., lower data loss, e.g., by adapting the storage controller to store the MSBs of AI data with greater error protection (e.g., store in SLCs, or store with stronger ECC, or replicate in multiple memory blocks), compared to the LSBs of the AI data units, and by wear leveling.

The disclosed techniques can use multiple storage devices concurrently to accelerate AI computing (inference/training). These techniques can also be adapted to be compatible with existing storage architectures, e.g., by adopting different memory partitions for storing for AI data and for storing non-AI data.

The disclosed techniques can be applied to various types of storage systems, e.g., storage systems that are based on NAND flash memory or NOR flash memory, such as universal flash storage (UFS), peripheral component interconnect express (PCIe) storage, embedded multimedia card (eMMC) storage, storage on dual in-line memory modules (DIMM), among others. Additionally or alternatively, the techniques can be applied to various types of other memory devices, such as static random access memory (SRAM), dynamic random access memory (DRAM), resistive random access memory (ReRAM), magnetoresistive random-access memory (MRAM), or phase-change memory (PCM) among others. The techniques can also be applied to magnetic disks or optical disks, among others.

The disclosed techniques can be applied to various applications that use AI mechanisms, such as ANNs for deep learning. These applications include gaming, natural language processing, expert systems, vision systems, speech recognition, handwriting recognition, intelligent robots, data centers, cloud computing services, and automotive applications, among others.

The details of one or more disclosed implementations are set forth in the accompanying drawings and the description below. Other features, aspects, and advantages will become apparent from the description, the drawings and the claims.

BRIEF DESCRIPTION OF THE DRAWINGS

FIGS. 5A-5E illustrate examples of AI-aware mapping table designs used by a storage controller.

Like reference numbers and designations in the various drawings indicate like elements.

DETAILED DESCRIPTION

Figures 1A, 1B:
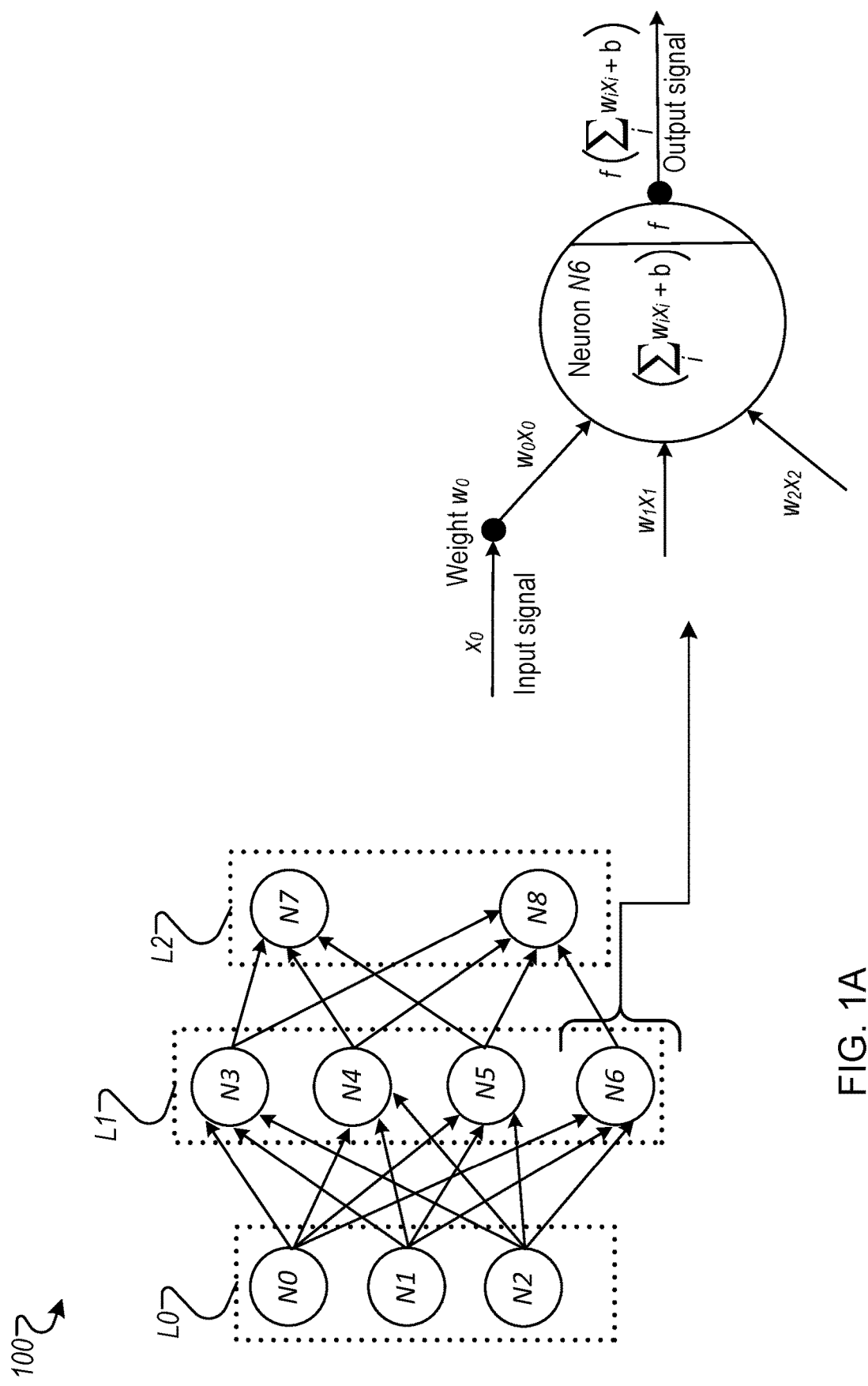
FIGS. 1A and 1B illustrate an example of an ANN and an exploded view of a neuron of the ANN, respectively.

Some AI applications use deep learning as a computational technique, in which ANNs are trained with methods such as unsupervised pre-training. In this context, an ANN is an interconnected group of nodes, e.g., similar to the vast network of neurons in a brain. FIGS. 1A and 1B illustrate an example of an ANN 100 and an exploded view of a neuron N6 of the ANN 100, respectively. As shown in FIG. 1A, the ANN 100 is a collection of connected units or nodes, e.g., N0, N1, N2, N3, N4, N5, N6, N7 and N8, which are called artificial neurons (e.g., a simplified version of biological neurons in an animal brain). The artificial neurons are organized in layers. For example, layer L0 includes artificial neurons N0, N1 and N2; layer L1 includes artificial neurons N3, N4, N5 and N6; and layer L2 includes artificial neurons N7 and N8.

In some implementations, different layers of an ANN perform different kinds of transformations on their inputs. One of the layers is a first or input layer of the ANN, e.g., layer L0, while another layer is a last or output layer of the ANN, e.g., layer L2. The ANN includes one or more internal layers, e.g., layer L1, between the input layer and the output layer. Signals travel from the input layer to the output layer, after traversing the internal layers one or more times.

In some implementations, each connection between artificial neurons, e.g., a connection from N2 to N6, or from N6 to N8, can transmit a signal from one to another. The artificial neuron that receives the signal can process it and then signal artificial neurons connected to it. In some implementations, the signal at a connection between artificial neurons is a real number, and the output of each artificial neuron is calculated by a non-linear function of the sum of its inputs. Each connection typically has a weight that adjusts as learning proceeds. The weight increases or decreases the strength of the signal at a connection. FIG. 1B shows an exploded view of an artificial neuron N6, which is an example of artificial neurons in an ANN. Input signals $x_0$, $x_1$ and $x_2$ from other artificial neurons of the ANN 100, e.g., from artificial neurons N0, N1 and N2 respectively, are sent to the artificial neuron N6. Each input signal is weighted by a weight associated with the corresponding connection, and the weighted signal is received and processed by the artificial neuron. For example, the connection from artificial neuron N0 to artificial neuron N6 has a weight $w_0$ that weights the signal $x_0$ sent from N0 to N6 via the connection, such that the value of the signal received and processed by N6 is $w_0 x_0$. Similarly, the connections from artificial neurons N1 and N2 to artificial neuron N6 have weights $w_1$ and $w_2$ respectively, such that the value of the signals received by N6 from N1 and N2 are $w_1 x_1$ and $w_2 x_2$, respectively.

An artificial neuron processes the weighted input signals internally, e.g., by changing its internal state (referred to as activation) according to the input, and produces an output signal depending on the input and the activation. For example, the artificial neuron N6 produces an output signal that is a result of output function $f$ that is applied to the weighted combination of the input signals received by the artificial neuron N6. In this manner, the artificial neurons of the ANN 100 form a weighted, directed graph that connects the outputs of some neurons to the inputs of other neurons. In some implementations, the weights, the activation function, the output function, or any combination of these parameters of an artificial neuron, can be modified by a learning process, e.g., deep learning.

In some cases, deep learning involves storage of large quantities of AI data (e.g., weights) that are used in training an ANN. Conventional storage mechanisms rely on file-based management, using an FTL in which file names act as indices to find data in storage. In conventional storage, the data are stored in the storage memory in size units of 512 bytes to 4096 bytes using, e.g., block-based mapping. On the other hand, AI data, e.g., weights, do not correspond to a name-based structure, such that mapping to a file name-based model, e.g., using FTL, can be challenging. Additionally, sizes of AI data can be small, e.g., of the order of 4 bytes. Storing such data in 512-byte units using block-based mapping can be inefficient, leading to considerable space wastage in the storage device.

Accordingly, it can be useful to design new techniques for storage and processing of AI data. Such new techniques for storing and processing AI data are described in this specification. As detailed in the following sections, in some implementations, a novel neuron-based mapping table design is used to map artificial neurons to PBAs, PPAs, or both. The described techniques also use data management, wear-leveling, and logging mechanisms that rely on the unique features of ANNs to improve performance and reliability of accessing AI data. These features of ANNs include: fault tolerance, e.g., some data error does not affect the final results; data locality, e.g., some AI data are accessed more frequently than other AI data; differences in data importance, e.g., some AI data are important than others, such as MSBs of the digital information storing weights being more important than LSBs in some implementations (and thereby error in MSBs can impact accuracy to a greater extent); and specific access flows, e.g., artificial neurons that are downstream of a currently accessed artificial neuron are more likely to be accessed next.

The disclosed techniques also combine novel access flow mechanisms with space management to further improve performance and reliability. For example, access behavior of neurons in an ANN can be predicted. If a neuron is accessed, weights of the connections at the output of the neuron, and of neurons that are connected downstream, can be pre-fetched from storage to reduce access latency.

Figure 2:
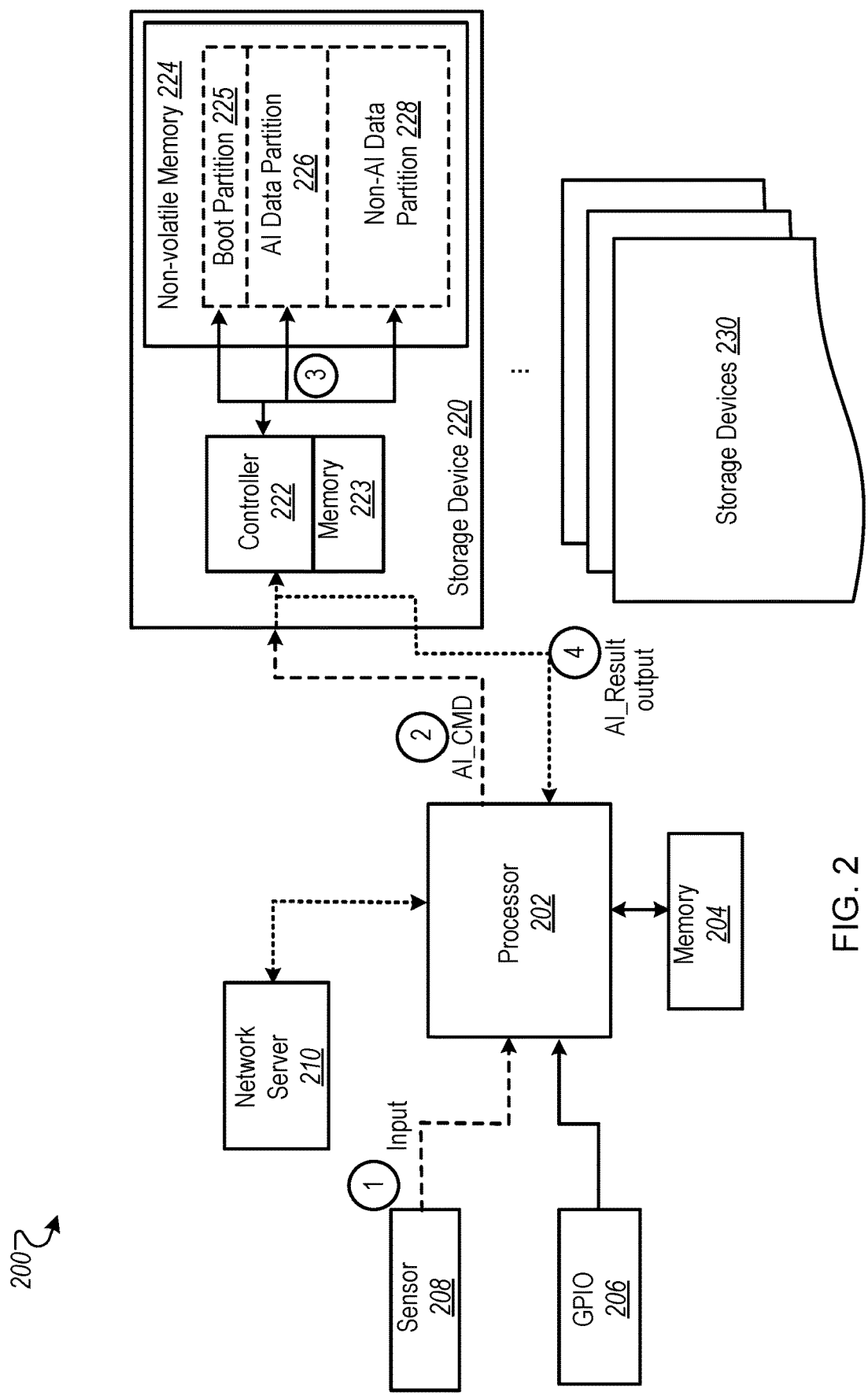
FIG. 2 illustrates an example system for storing and processing data for AI applications.

FIG. 2 illustrates an example system 200 for storing and processing data for AI applications. The system 200 includes one or more processors, represented as processor 202; one or more cache memory modules, represented as memory 204; one or more general purpose input/output (GPIO) PINs, represented as GPIO 206; one or more sensors, represented as sensor 208; and one or more network servers, represented as network server 210. The system 200 further includes a storage device 220, which is coupled to the processor 202. The storage device 220 includes a storage controller 222; an internal cache memory module 223 that is associated with the storage controller 222; and a non-volatile memory (NVM) storage 224 that is partitioned into several partitions, e.g., a boot partition 225, an AI data partition 226, and a non-AI data partition 228. In some implementations, the system 200 includes additional storage devices, represented as storage device 230, coupled to the processor 202. The storage device 230 is similar to the storage device 220.

In some implementations, the system 200 corresponds to a computing system in which the different components are disparate pieces of interconnected hardware. In such cases, the storage devices 220 and/or 230 are independent storage modules connected to a separate host device that includes the processor 202. For example, the storage devices 220 and/or 230 can be external storage devices, such as external flash memory disks. In some implementations, the system 200 corresponds to an integrated device that includes the various components. In such implementations, the system 200 is an integrated circuit or a computer board hosting the processor 202 and the storage devices 220 and/or 230. Examples of such integrated circuits include system-on-a-chip (SoC), embedded and custom hardware, programmable logic devices (for example, field programmable gate arrays (FPGAs)), and multifunction chips. In such cases, the storage devices 220 and/or 230 can be embedded storage devices, such as embedded flash memory modules.

The following sections describe various techniques for storing and processing data for AI applications with respect to a solid-state storage device, such as a flash memory device. However, these techniques are also applicable to storing and processing of AI data in cache or main memory devices, as noted previously.

In some implementations, the system 200 stores data for AI applications separately from data for non-AI applications. For example, the system 200 stores AI data in AI data partition 226 of the storage device 220, and stores non-AI data in non-AI data partition 228. In such implementations, when the processor 202 receives an input (e.g., a data input) from one or more connected components, the processor 202 performs memory access operations differently, depending on whether the input is for AI applications, or for non-AI applications. If the input is for non-AI applications, then the processor 202 accesses a corresponding memory location that is affected by the input in the non-AI data partition 228, and performs an operation (e.g., read or write) using the accessed memory location. The processor 202 uses a result of the operation to control one or more connected components, e.g., by sending a command to a connected device through GPIO 206.

On the other hand, if the input is for an AI application, then the processor 202 sends the AI data, along with a corresponding AI command, to the storage controller 222. In some implementations, the input is a data input for AI inference and training, which are aspects of deep learning used in an AI application. In such implementations, the AI command is an inference and training command, which includes multiple read operations, e.g., read data, such as a weight of a neuron connection, from a memory location in the storage device; write operations e.g., write data to a memory location in the storage device; and computing operations, e.g., multiply and accumulation (MAC) and miscellaneous activation and pooling functions for the weights and input image data for an ANN. Upon receiving such an AI command, the storage controller 222 accesses affected memory locations for the AI data in the AI data partition, and performs the read, write, and/or computing operations specified by the AI command using the data in the accessed memory locations. The storage controller 222 returns a result of the operations to the processor 202.

As an illustrative example shown in FIG. 2, the processor 202 receives an input (1), e.g., a data input, from sensor 208. The processor 202 determines that the data is for an AI application, and accordingly identifies an inference and training command for deep learning, e.g., similar to those described above, that is to be performed in response to the input. The processor sends a corresponding AI command AI_CMD (2) to the storage controller 222. In some implementations, the input (1) is sent along with the AI_CMD (2), while in other implementations, only the AI_CMD (2) is sent to the storage controller 222. In some implementations, e.g., where there are multiple storage devices 220 and 230, the processor 202 also determines the storage device that is affected by the input, and sends the AI command to the storage controller of the affected storage device.

The storage controller 222 determines, from the AI_CMD (2), the read, write, or computing operations (or any suitable combination of these operations) that are to be performed, and accesses (3) one or more memory locations in the AI data partition 226 that are affected by these operations. The storage controller 222 performs the operations, e.g., reading a weight from a stored memory location, writing an updated weight to a memory location, or both. The storage controller 222 also sends a result of performing the operations, AI_Result output (4), e.g., an updated weight, to the processor 202. The AI_CMD (2) sent by the processor 202 and the operations performed by the storage controller 222 for AI data, are described in detail in the following sections.

The above operation of the system 200 is in contrast to conventional systems. In conventional systems, a processor, upon receiving data for an AI application, accesses one or more affected memory locations in the storage device, and performs the operations for inference and training (e.g., read, write or computing operations) using the weights stored in these memory locations. The storage controller of the storage device is used in a conventional manner, e.g., to load the data from the memory locations for use by the processor to perform the operations, or to write the results of the operations performed by the processor. The storage controller does not locally perform the operations for inference and training based on a command from the processor. Additionally, in conventional systems, the data stored in the memory locations are not partitioned into separate partitions based on whether the data is for AI applications or for non-AI applications.

Figure 3:
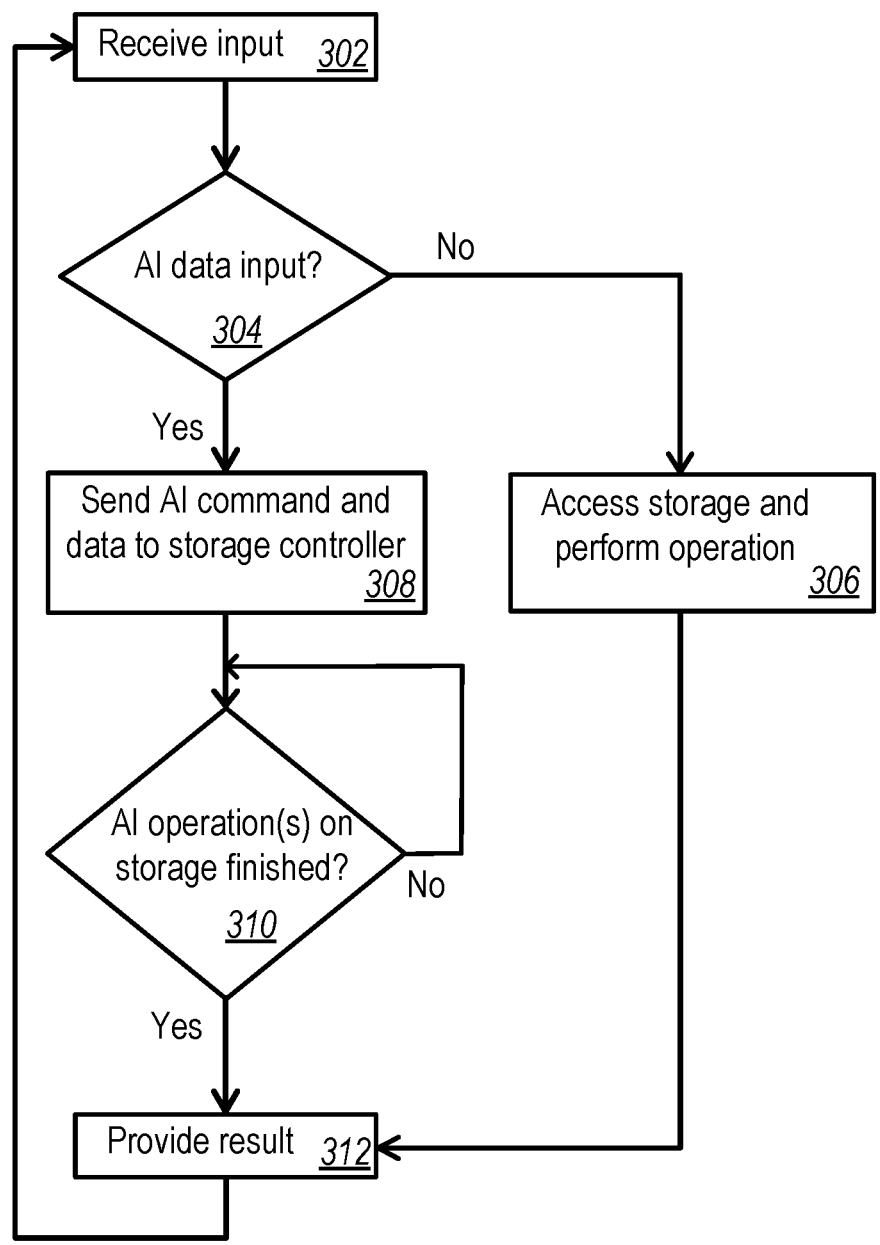
FIG. 3 illustrates an example of a process to access a storage device for AI applications.

FIG. 3 illustrates an example of a process 300 to access a storage device for AI applications. In some implementations, the process 300 is performed by the system 200, e.g. by processor 202 and storage controller 222, to localize AI operations, e.g., read, write or computing operations for inference and training commands corresponding to deep learning of an ANN, in the storage device 220. Accordingly, the following sections describe the process 300 with respect to the processor 202 and the storage controller 222. However, in other implementations, the process 300 may be performed by other devices or systems.

The process 300 starts at 302, when an input is received. For example, in some implementations, the processor 202 receives a data input from a device connected to the processor, such as input (1) from sensor 208.

At 304, a determination is made whether the input is an AI data input. For example, the processor 202 determines whether the input (1) received from the sensor 208 is a data input for an AI application.

If a determination is made at 304 that the input is not an AI data input, then, at 306, a storage is accessed and an operation is performed. For example, if the processor 202 determines that a input is a non-AI data input, i.e., intended for a non-AI application, then the processor 202 accesses the affected memory locations in the non-AI data partition 228 of the storage device 220, e.g., uses the storage controller 222 to load the target memory page or memory block from the non-AI data partition 228 to the cache memory 204 coupled to the processor 202. The processor 202 then performs the operations, such as read or write of data for the accessed memory locations using the page or block loaded to the cache memory 204, and then stores the updated memory page or memory block in the non-AI data partition 228.

On the other hand, if a determination is made at 304 that the input is an AI data input, then, at 308, an AI command and data are sent to a storage controller. For example, if the processor 202 determines that the input received from the sensor 208 is AI data, then the processor 202 sends the AI data along with an AI command (e.g., AI_CMD (2)) to the storage controller 222. As described previously, in some implementations, the AI command includes inference and training commands for deep learning of an ANN, whose connection weights and neuron activation functions are stored in memory locations in the AI data partition 226 of the storage device 220.

At 310, a determination is made whether AI operation(s) on storage are finished. For example, upon receiving the AI command from the processor 202, the storage controller 222 accesses the affected memory locations in the AI data partition 226, and performs the operations corresponding to the AI command. As described previously, in some implementations, the controller 222 performs: one or more read operations, e.g., reads connection weights for neurons and/or ANN layers from the memory locations; one or more write operations, e.g., updates connection weights stored in the memory locations; and one or more computing operations, e.g., multiply and accumulation and miscellaneous functions, such as activation and pooling functions for the weights and data input. In some implementations, the read and write operations are divided into small subsets of commands corresponding to different accessed memory pages.

The process 300 iterates at 310 if a determination is made that the AI operation(s) on storage are not finished. For example, the controller 222 performs multiple read, write or computing operations for the AI command, until all the affected weights stored in the AI data partition 226 are addressed. The processor 202 waits to receive a result of the operations performed by the controller 222 for the AI command. In some implementations, the processor 202 performs other tasks while it waits for the AI command result from the controller 222.

If a determination is made at 310 that the AI operation(s) on storage are finished, then, at 312, a result is provided. For example, the storage controller 222, upon completing the operations for the AI command by accessing memory locations in the AI data partition 226, sends a result of the operations to the processor 202. In some implementations, the processor 202 receives an indication of pass or fail from the controller 222 as the result of the AI command. In some implementations, the processor 202 receives data, e.g., an output of the updated ANN, from the controller 222 as the result of the AI command. In some implementations, in response to the receiving the result from the controller 222, the processor 202 performs a GPIO control operation. The process 300 then reverts to 302, e.g., waiting for the processor 202 to receive the next input from a component connected to the processor, such as sensor 208.

In the above manner, the system 200 can offload AI operations to be performed locally at the storage device 220 by the storage controller 222, which accelerates AI inference and training. Operations performed by the processor 202 are thus amortized, thereby reducing loading on the processor. Movement of data between the processor 202 and the storage device 220 are also reduced, thereby saving internal device bandwidth. Accordingly, performance and reliability for handling AI data by the system 200 are improved.

Figure 4:
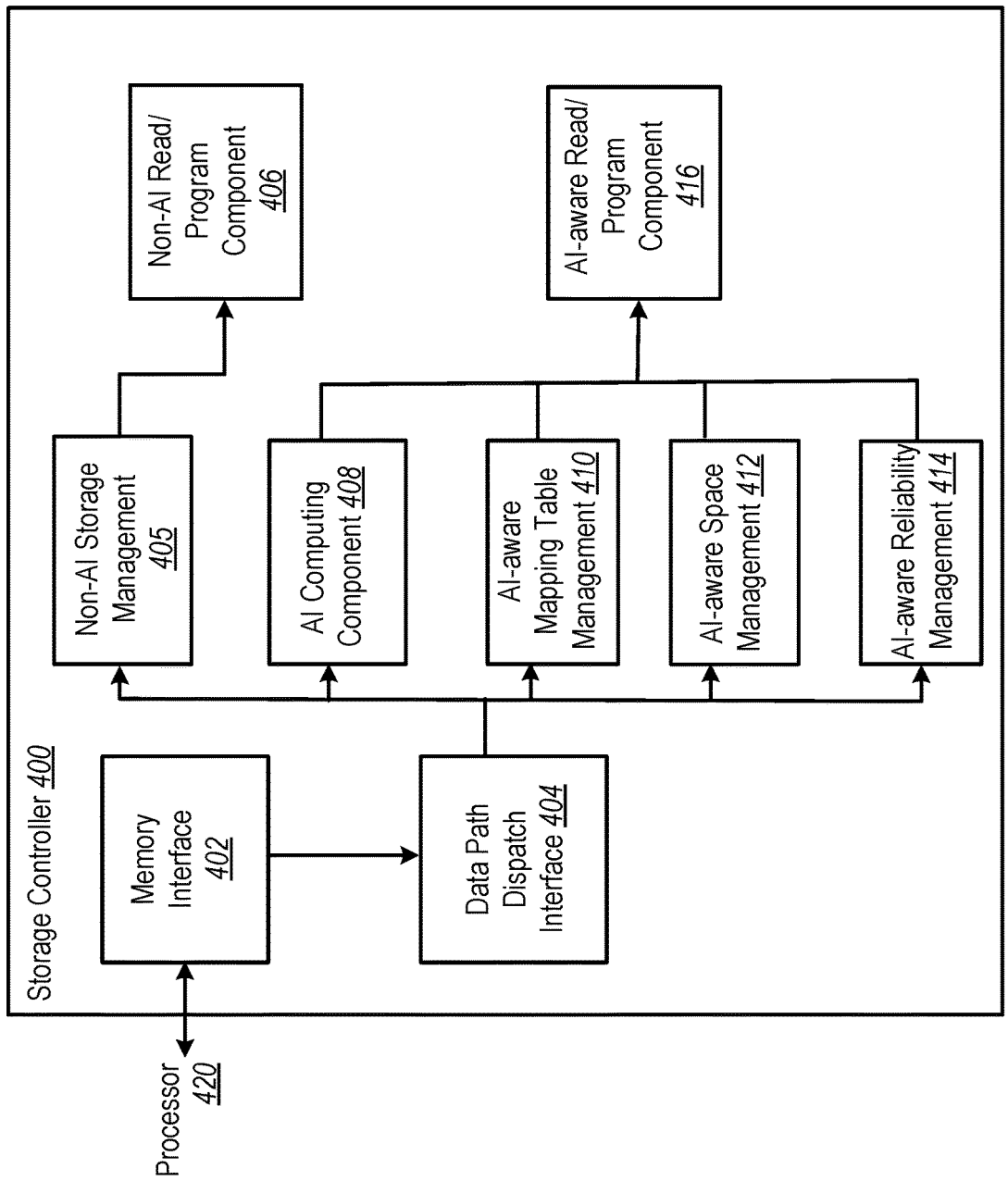
FIG. 4 illustrates an example of a storage controller of a memory storage device that is configured to perform AI operations.

FIG. 4 illustrates an example of a storage controller 400 of a memory storage device that is configured to perform AI operations. In some implementations, the storage controller 400 is similar to the storage controller 222. The storage controller 400 includes a memory interface 402, a data path dispatch interface 404, a non-AI storage management component 405, a non-AI read/program component 406, an AI computing component 408, an AI-aware mapping table management component 410, an AI-aware space management component 412, an AI-aware reliability management component 414, and an AI-aware read/program component 416.

The memory interface 402 is a hardware storage interface that enables the storage controller 400 to communicate with other devices, e.g., processor 420. In some implementations, the storage device is a non-volatile dual in-line memory module (NVDIMM). In such cases, the memory interface 402 is one of an NVDIMM-N interface, an NVDIMM-F interface, or an NVDIMM-P interface. In some implementations, the memory interface 402 is an UFS interface. In some implementations, the memory interface 402 is an eMMC interface. In some cases, the memory interface 402 is a PCIe interface. In some implementations, the processor 420 is similar to the processor 202. For example, the storage controller 400 receives AI commands and corresponding AI data from the processor 420 through the memory interface 402.

In some implementations, the data path dispatch interface 404, non-AI storage management component 405, non-AI read/program component 406, AI computing component 408, AI-aware mapping table management component 410, AI-aware space management component 412, AI-aware reliability management component 414, and AI-aware read/program component 416 are implemented as hardware circuitry, e.g., programmed in firmware of the storage controller 400, or in FPGAs. In some implementations, these components are written as software routines, e.g., encoded as instructions stored in memory that are executed by the storage controller 400 by loading the instructions in the controller's cache. In some implementations, these components are realized as a combination of hardware circuitry and software routines.

The data path dispatch interface 404 includes instructions that enable the storage controller 400 to determine whether to access memory locations in an AI data partition (e.g., similar to AI data partition 226), or in a non-AI data partition (e.g., similar to non-AI data partition 228). For example, as described previously, when the processor 420 processes non-AI data, the controller 400 uses the data path dispatch interface 404 to forward the processor's request to the non-AI storage management component 405, which access memory pages or memory blocks from the non-AI data partition for loading into the processor's cache. In some implementations, the non-AI storage management component 405 implements a file based management (e.g., mapping logical block addresses to physical block addresses) to manage the memory locations in the non-AI data partition. The non-AI storage management component 405 uses the non-AI read/program component 406 to read from, or write to, physical memory pages and/or memory blocks in the non-AI data partition.

When the processor 420 sends an AI command and accompanying AI data, the controller 400 uses the data path dispatch interface 404 to forward the AI command and the AI data to one or more of the AI computing component 408, AI-aware mapping table management component 410, AI-aware space management component 412, and AI-aware reliability management component 414, to perform the AI inference and training operations by accessing memory locations in the AI data partition. The controller 400 uses the AI computing component 408, AI-aware mapping table management component 410, AI-aware space management component 412, and AI-aware reliability management component 414 to perform AI operations on the storage device, e.g., as described at 310 of process 300.

The AI computing component 408, AI-aware mapping table management component 410, AI-aware space management component 412, and AI-aware reliability management component 414 uses various techniques optimized for AI applications to process AI commands and AI data. For example, in some implementations, the AI-aware mapping table management component 410 uses an artificial neuron-based mapping table to map neurons to the physical block addresses or page addresses in storage. In some implementations, the AI-aware mapping table management component 410 uses other data structures suitable for AI-based objects, such as batch-based mapping, layer-based mapping, or image-based mapping.

The AI-aware space management component 412 and the AI-aware reliability management component 414 use AI-based data management, wear-leveling, and logging mechanisms to improve the performance and reliability of AI applications whose data are stored in the storage device managed by storage controller 400. These AI-aware components use the AI-aware read/program component 416 to read from, or write to, physical memory pages and/or memory blocks in the AI data partition. Functions of the AI computing component 408, AI-aware mapping table management component 410, AI-aware space management component 412, and AI-aware reliability management component 414 are described in greater detail in the following sections.

FIGS. 5A-5E illustrate examples of AI-aware mapping table designs 500A-500E used by a storage controller. In some implementations, the AI-aware mapping table designs 500A-500E are realized by the storage controller 222 to manage the memory locations in the AI data partition 226 of the storage device 220. In some implementations, an AI aware mapping table management component, e.g., AI aware mapping table management component 410, in the storage controller uses the AI-aware mapping table designs 500A-500E. In some implementations, the mapping table designs 500A-500E are neuron-based mapping table designs that map artificial neurons to the physical block addresses and/or physical page addresses, as indicated previously. The following sections describe the storage techniques with respect to connection weights as data. However, storage of other types of AI data, e.g., neuron activation functions, can also use these storage techniques.

Figure 5A:
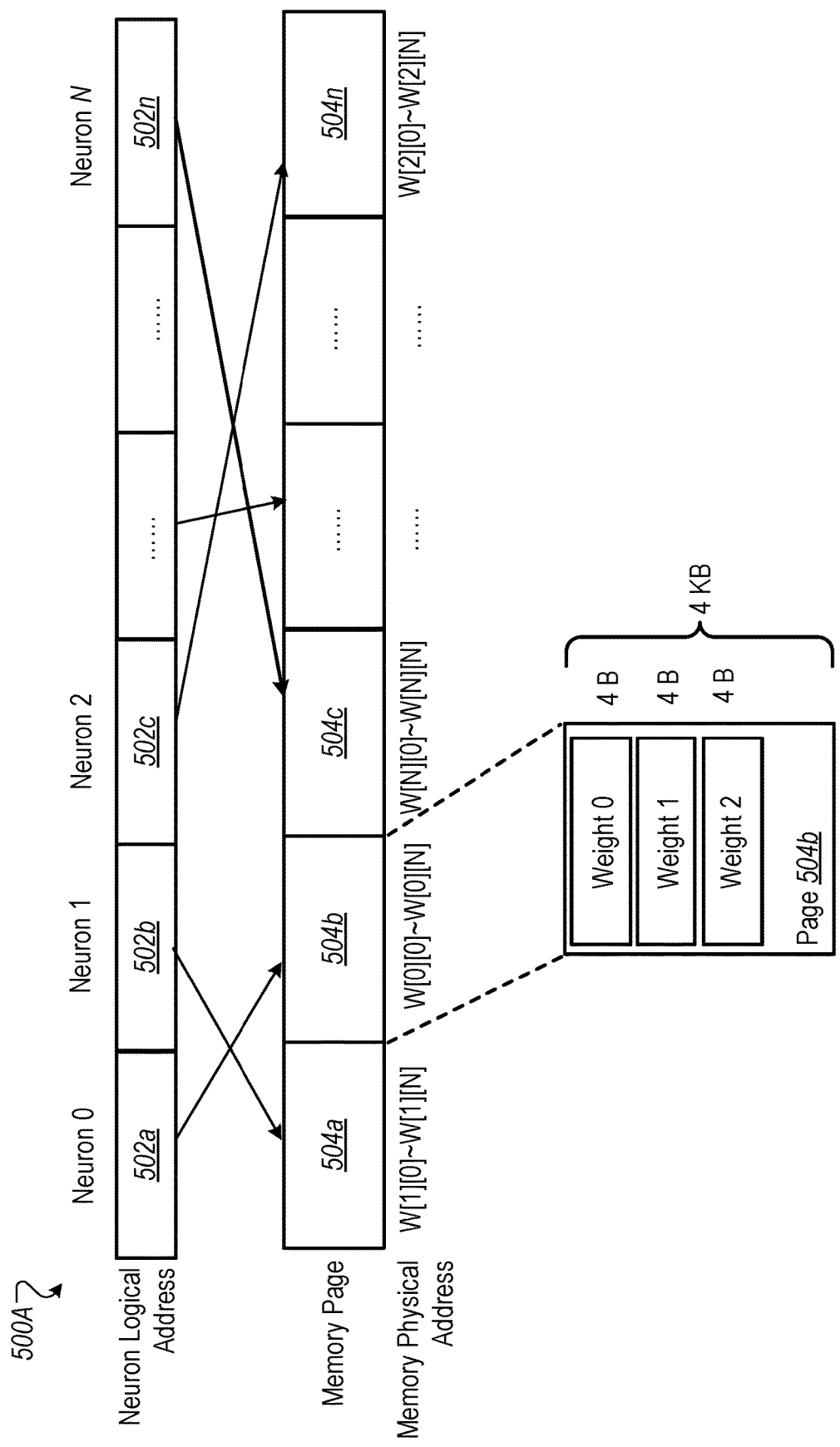

As shown in FIG. 5A, in some implementations, the storage controller uses a hierarchical mapping table design 500A, which takes advantage of the data locality feature of ANNs. Using the hierarchical mapping table design 500A, the storage controller stores weights that relate to the same neuron in the same memory page. For example, in some implementations, the logical addresses of artificial neuron 0, neuron 1, neuron 2, and neuron N of an ANN are, respectively, 502*a*, 502*b*, 502*c* and 502*n*. The storage controller stores the data, e.g., weights, for each neuron in one page of the flash memory. For example, weights for neuron 0, neuron 1, neuron 2 and neuron N are stored in memory pages 504*b*, 504*a*, 504*n* and 504*c*, respectively.

As described with respect to the example of neuron N6 in FIG. 1B, the weights for each neuron are the weights for the input and output connections of the neuron. The example of FIG. 5A shows that, in using the hierarchical mapping table design 500A, the storage controller determines the neuron with which a weight is associated, and stores the weight in a memory page that is used to store the weights corresponding to that neuron. For example, the weights for the input and output connections of neuron 0 are stored in the page 504*b* with memory physical addresses between W[0][0] and W[0][N]. In some implementations, each memory page, e.g., memory page 504*b*, is 4 kilobytes (KB) in size. Each weight of a particular neuron, e.g., weight 0, weight 1 and weight 2 for neuron 0, is stored in 4-byte (B) units in the memory page. Different sizes of the memory pages and the weights are possible in other implementations.

As noted previously, in some implementations, the physical memory in the storage device is a solid-state memory, e.g., flash memory. In some implementations, different memory pages storing the weights for the neurons are located in the same channel and plane of the flash memory. For example, in the hierarchical mapping table design 500A, the memory pages 504*a*, 504*b*, 504*c* and 504*n* are located in the same channel and plane of the physical memory, in some implementations. In this context, a channel is a simultaneous access unit for a flash memory, which can have multiple channels. Each channel includes multiple flash chips, with a plane being a simultaneous access unit for a flash chip. Each flash chip can include multiple planes.

However, in some implementations, the storage controller uses a modified hierarchical mapping table design 500B shown in FIG. 5B. In some cases, multiple memory pages are used to collect and store the weights for a neuron, e.g., when the neuron has a large number of associated weights whose collective size exceeds the storage capacity of a memory page. Using the mapping table design 500B, the storage controller selects these multiple pages in a distributed manner, e.g., spreading the memory pages across different channels, or different planes, or both. For example, as shown in FIG. 5B, in some implementations, a large number of weights are associated with neuron 0 are collected and stored in four memory pages 506*a*, 506*b*, 506*c* and 506*d*. Memory page 506*a* stores weights in memory locations with addresses between W[0][0] and W[0][N]; memory page 506*b* stores weights in memory locations with addresses between W[0][N+1] and W[0][2N]; memory page 506*c* stores weights in memory locations with addresses between W[0][2N+1] and W[0][3N]; and memory page 506*d* stores weights in memory locations with addresses between W[0][3N+1] and W[0][4N].

The storage controller selects the memory pages in a distributed manner across different channels and different planes, e.g., memory page 506*a* is located in channel 0 and plane 0; memory page 506*b* is located in channel 0 and plane 1; memory page 506*c* is located in channel 1 and plane 0; and memory page 506*d* is located in channel 1 and plane 1. Storing the weights for a neuron in such a distributed manner accelerates the access speed to the data, e.g., the storage controller can read from, or write to, memory pages in different channels and/or planes concurrently.

In some implementations, the storage controller uses a mapping table design 500C or 500D, shown in FIGS. 5C and 5D, respectively, in which weights are stored in different types of memory locations depending on the importance of a weight, or a neuron, or both. The mapping table design 500C illustrates an example of a single page design. Using the mapping table design 500C, the storage controller collects and stores the weights of a neuron in one memory page, e.g., memory page 508, which includes memory cells of different types, e.g., SLCs, MLCs, TLCs and QLCs. Weights of the same neuron can be of varying importance—the weights are stored in different types of cells depending on the importance of the weights. For example, in some implementations, important weights are stored in SLCs, while weights that are less important are stored in MLCs, TLCs, or QLCs, or any combination of these. In some implementations, important weights are stored in MLCs, while weights that are less important are stored in TLCs and/or QLCs. In some implementations, important weights are stored in TLCs, while weights that are less important are stored in QLCs. Since SLC, MLC, TLC and QLC are in descending order of robustness, the mapping table design 500C attempts to ensure that the most important weights are stored with greater reliability, compared to the less important weights.

In this context, the importance of a weight is based on the impact the weight has in determining the result of an activation function used by the neuron. For example, a neuron has four weights: $w_0$ with value 0.5, $w_1$ with value 0.4, $w_3$ with value 0.3 and $w_4$ with value 0.2. Accordingly, $w_0$ has a greater impact than the other weights to decide the results of the activation function of the neuron, while $w_4$ has the least impact. Weight $w_0$ therefore has the highest importance amongst the weights of the neuron, while $w_4$ has the lowest importance.

In some implementations, the storage controller determines the importance by comparing to a known threshold. If the value of a weight is greater than the threshold, the weight is considered important, while the weight is deemed as unimportant if the value is less than the threshold.

In some implementations, multiple thresholds are used, e.g., threshold 1, threshold 2 and threshold 3, with threshold 3 having a higher value than threshold 2, which in turn has a higher value than threshold 1. In such cases, multiple levels of importance are possible. For example, if the value of a weight is greater than threshold 3, the weight is considered having importance level 4 that is the highest importance level; if the value of a weight is between threshold 3 and threshold 2, the weight is considered having importance level 3, which is less than importance level 4; if the value of a weight is between threshold 2 and threshold 1, the weight is considered having importance level 2, which is less than importance level 3; and if the value of a weight is less than threshold 1, the weight is considered having importance level 1, which is less than importance level 2 and is the lowest importance level. A weight having importance level 4 is stored in a SLC; a weight having importance level 3 is stored in a MLC; a weight having importance level 2 is stored in a TLC; and a weight having importance level 1 is stored in a QLC. Various permutations of the threshold levels and importance levels are possible, e.g., having two thresholds or four thresholds, or having three importance levels or five importance levels, among others.

In some implementations, the weight are arranged in an ascending or descending order of value. In such cases, the weights are stored in different types of cells depending on their values. E.g., a weight with the highest value is stored in a SLC, while a weight with the lowest value is stored in a QLC.

FIG. 5C illustrates an example of neuron 0 having four weights that are stored in a memory page 508, in memory cells 508a, 508b, 508c and 508d included in the memory page 508. The memory cells 508a, 508b, 508c and 508d are of types SLC, MLC, TLC and QLC, respectively. Using the mapping table design 500C, SLC memory cell 508a stores the weight of neuron 0 that is has the highest importance level (e.g., weight $w_0$ in the preceding example); MLC memory cell 508b stores a weight that is of medium high importance level—e.g., less that the highest importance level (e.g., weight $w_1$ in the preceding example); TLC memory cell 508c stores a weight that is of medium low importance level, e.g., less that the medium high importance level (e.g., weight $w_2$ in the preceding example); and QLC memory cell 508d stores a weight that is of the lowest importance level, e.g., less that the medium high importance level (e.g., weight $w_4$ in the preceding example).

The mapping table design 500D of FIG. 5D illustrates an example of a cross page design. Using the mapping table design 500D, in some implementations, the storage controller collects and stores weights of varying importance in different memory pages that have different types of memory cells. For example, the most important weights of a neuron are stored in a memory page that includes SLCs, while weights of the neuron with lower importance are stored in a memory page that includes MLCs.

Additionally or alternatively, different portions of a single weight can be stored in different types of memory cells, which can be in the same memory page, or distributed across different memory pages. For example, in some implementations, the MSBs of a weight (e.g., higher 16 bits of a 4-byte weight value) are more important than the LSBs of the weight (e.g., lower 16 bits of the 4-byte weight value). In such cases, the MSBs of a weight are stored in a SLC, while the LSBs of the weight are stored in an MLC, TLC or QLC. FIG. 5D illustrates an example of a neuron having a weight value with MSBs 510a and LSBs 510b. Using the mapping table design 500D, the MSBs 510a are stored in a SLC in a memory page 512a, while the LSBs 510b are stored in a MLC in a memory page 512b. In some implementations, the MSBs and the LSBs are stored in, respectively, an SLC and an MLC (or respectively in a MLC and TLC, or SLC and TLC, among others) in the same memory page.

Figure 5E:
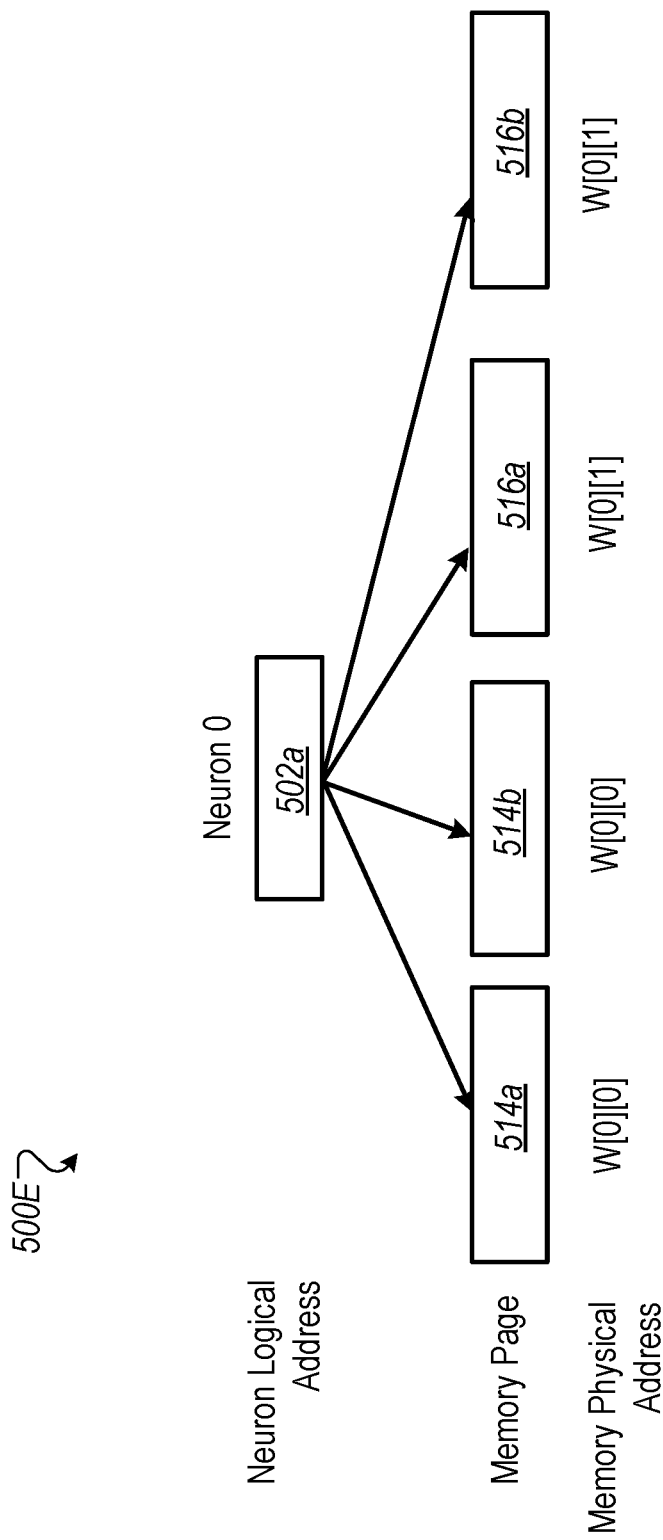

In some implementations, the storage controller uses a mapping table design 500E, shown in FIG. 5E, that realizes a weight-based RAID (Redundant Array of Independent Disks) architecture. Using the mapping table design 500E, the storage controller replicates important weights of a neuron across multiple memory pages to enhance reliability of storage of the weights. For example, as shown in FIG. 5E, in some implementations, a neuron 0 has two important weights that are stored in memory locations with physical addresses W[0][0] and W[0][1]. The memory location with physical address W[0][0] is replicated across two different memory pages 514a and 514b, while the memory location with physical address W[0][1] is replicated across two different memory pages 516a and 516b.

In some implementations, the memory pages 514a, 514b, 516a and 516b are all distinct. In some implementations, memory page 514a can be same as one of memory pages 516a or 516b, or memory page 514b can be same as one of memory pages 516a or 516b, provided each important weight is replicated across different memory pages for redundancy.

In some implementations, the storage controller determines the importance levels for replication using the techniques described above. In some implementations, weights with different importance levels can be replicated using different RAID architectures. For example, in some implementations, a weight with importance level 4 is replicated across five different memory pages; a weight with importance level 3 is replicated across four different memory pages; and a weight with importance level 2 is replicated across three different memory pages.

The mapping table designs 500C, 500D and 500E have been described above with respect to storing weights of neurons. The mapping table designs 500C, 500D, or 500E, can be used, in similar manners, to order different neurons or different AI images in varying orders of importance, and store the corresponding information (e.g., weights associated with important neurons and unimportant neurons) in different types of cells.

Figure 6:
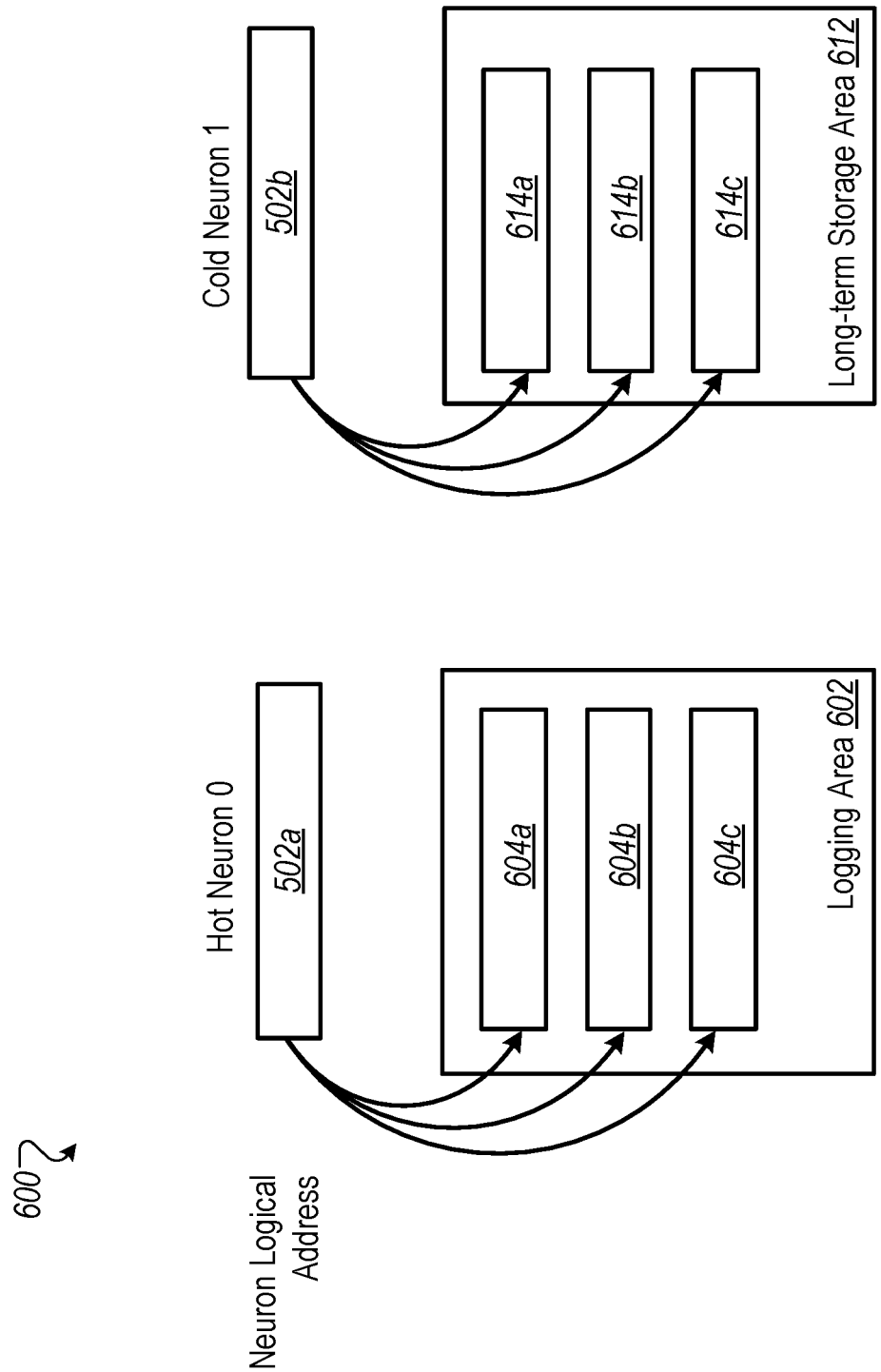
FIG. 6 illustrates an example of an AI-aware space management technique used by a storage controller.

FIG. 6 illustrates an example of an AI-aware space management technique 600 used by a storage controller. In some implementations, the AI-aware space management technique 600 is realized by the storage controller 222 to manage the memory locations in the AI data partition 226 of the storage device 220. In some implementations, an AI-aware space management component, e.g., AI-aware space management component 412, in the storage controller uses the AI-aware space management technique 600. The following sections describe the AI-aware space management technique 600 with respect to connection weights as data. However, storage of other types of AI data, e.g., neuron activation functions, can also use the space management technique.

In some implementations, the storage controller uses the AI-aware space management technique 600 when performing training mode operations for an ANN. In this context, when an ANN is in training mode, the weights of connections of the ANN are updated frequently, which can introduce reliability and performance issues. To address these issues, the storage controller, using the AI-aware space management technique 600, reallocates values for a frequently accessed weight to the logging area of the physical flash memory, instead of writing the frequently changing updated value of the weight to the long-term storage area of the flash memory. Since the long-term storage is not accessed with the high frequency corresponding to every change in value of the weight, data that are stored long term in the flash memory are not disturbed, and there is no overhead for garbage collection.

As an example, as shown in FIG. 6, in some implementations, neuron 0 is a "hot" neuron—a neuron whose weights are frequently updated, e.g., during training an ANN. Accordingly, using the AI-aware space management technique 600, the storage controller stores successive values of the weights corresponding to the hot neuron 0 in the logging area 602 of the physical flash memory. For example, the storage controller initially accesses a stored value of a weight of neuron 0 from its memory location in the long-term storage area 612. Following a training operation, an updated value of the weight is stored in the memory location 604a in the logging area 602. Subsequent updated values of the weight are stored successively in the memory locations 604b and 604c. When the storage controller determines that the weight is no longer updated at a high frequency, e.g., when the frequency at which the updates are happening falls below a known threshold rate, the storage controller writes the most recent value of the weight to the corresponding memory location in the long-term storage area 612.

In contrast to hot neuron 0, neuron 1 is a "cold" neuron, e.g., a neuron that is not frequently updated and therefore its weight is not accessed at a high frequency. Accordingly, each time the value of a weight associated with the neuron 1 is updated (which happens, for example, at a frequency that is lower than the known threshold rate), the storage controller writes the updated value to the corresponding memory location in the long-term storage area 612. For example, values of weights of the neuron 1 are written to the memory locations 614a, 614b and 614c following each update of the values.

Figure 7:
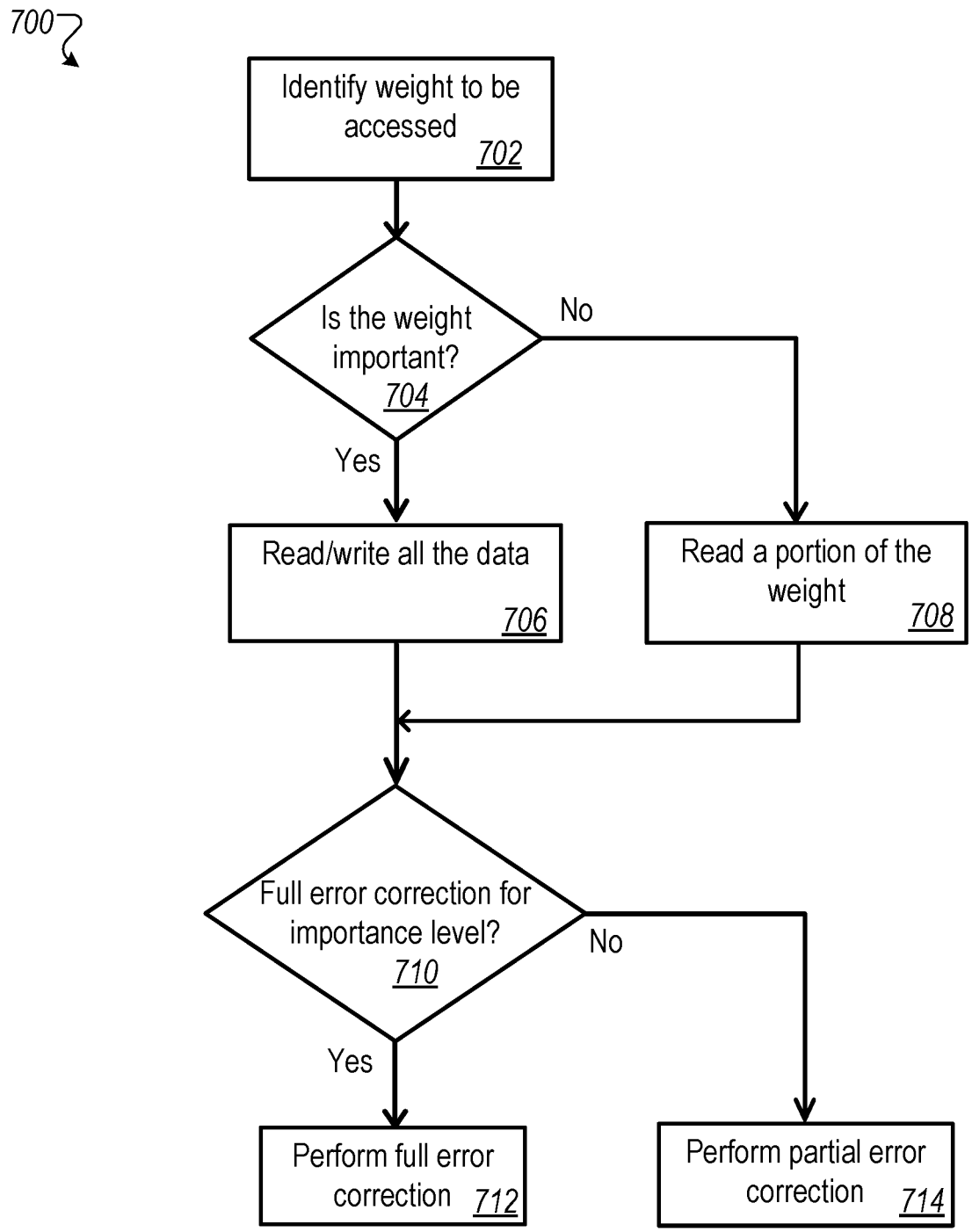
FIG. 7 illustrates an example of a process of an error-tolerant read/write operation for AI data.

FIG. 7 illustrates an example of a process 700 of an error-tolerant read/write operation for AI data. In some implementations, the process 700 is performed by the storage controller 222 to access memory locations in the AI data partition 226 of the storage device 220. The following sections describe the process 700 with respect to connection weights as data. However, storage of other types of AI data, e.g., neuron activation functions, can also use the process 700.

At 702, a weight to be accessed is identified. For example, the storage controller determines a weight that is to be accessed based on an AI command from the processor 202.

At 704, a determination is made whether the weight is important. For example, the storage controller, using the AI-aware read/program component 416, determines the importance level of a weight of a neuron that is to be accessed from its memory location in the AI data partition 226. The storage controller determines the importance level of the weight in a manner described previously, e.g., with respect to mapping table design 500C or 500D.

If the weight is determined to be important, then, at 706, a read/write is performed for all the data. For example, if the importance level of the weight is greater than a certain threshold value of importance (e.g., the weight is of importance level 4 that is described previously), then the storage controller performs a read or a write operation for all the stored bits of the weight, using an AI-aware read/program component, e.g., AI-aware read/program component 416.

On the other hand, if the weight is determined to be not important, then, at 708, a portion of the weight is read. For example, if the importance level of the weight is less than a certain threshold value of importance (e.g., the weight is of importance level 2 or 1 that are described previously), then the storage controller performs a read or a write operation, using, e.g., the AI-aware read/program component 416, for some of the stored bits of the weight, e.g., either the MSBs or the LSBs, but not all the bits of the weight.

At 710, a determination is made whether a full error correction is needed for the importance level of the weight. For example, the AI-aware read/program component 416 in the storage controller can be configured to perform, following a read/write operation, a full error correction using an error correcting code (ECC) for weights having the highest importance level, while performing a partial error correction for weights having other importance levels. Accordingly, if the weight has importance level 4, the storage controller determines that a full error correction is to be performed. However, if the weight has importance level 3 or lower, the storage controller determines that a partial error correction is to be performed.

If a determination is made that a full error correction is needed, then, at 712, a full error correction is performed. For example, if the storage controller determines that the weight has the highest importance level and thereby ensuring a high reliability of its value is needed, then the storage controller performs a full ECC check for the weight using, e.g., the AI-aware read/program component 416.

On the other hand, if a determination is made that a full error correction is not needed, then, at 714, a partial error correction is performed. For example, if the storage controller determines that the weight has a lower importance level that does not require ensuring a high reliability of the weight value, then the storage controller performs a partial ECC check for the weight using, e.g., the AI-aware read/program component 416.

In the above manner, the storage controller uses the process 700 to access the value of a weight and ensure its reliability depending on the importance of the weight. For weights with lower importance levels, the accuracy can be sacrificed (e.g., by performing a partial read, or a partial ECC, or both) to improve the speed of access, leading to overall performance improvements. An ANN can be tolerant of errors in reading values of weights that are of lower importance; accordingly, sacrificing the accuracy for weights with lower importance does not affect the overall accuracy of the ANN functionality.

Figure 8:
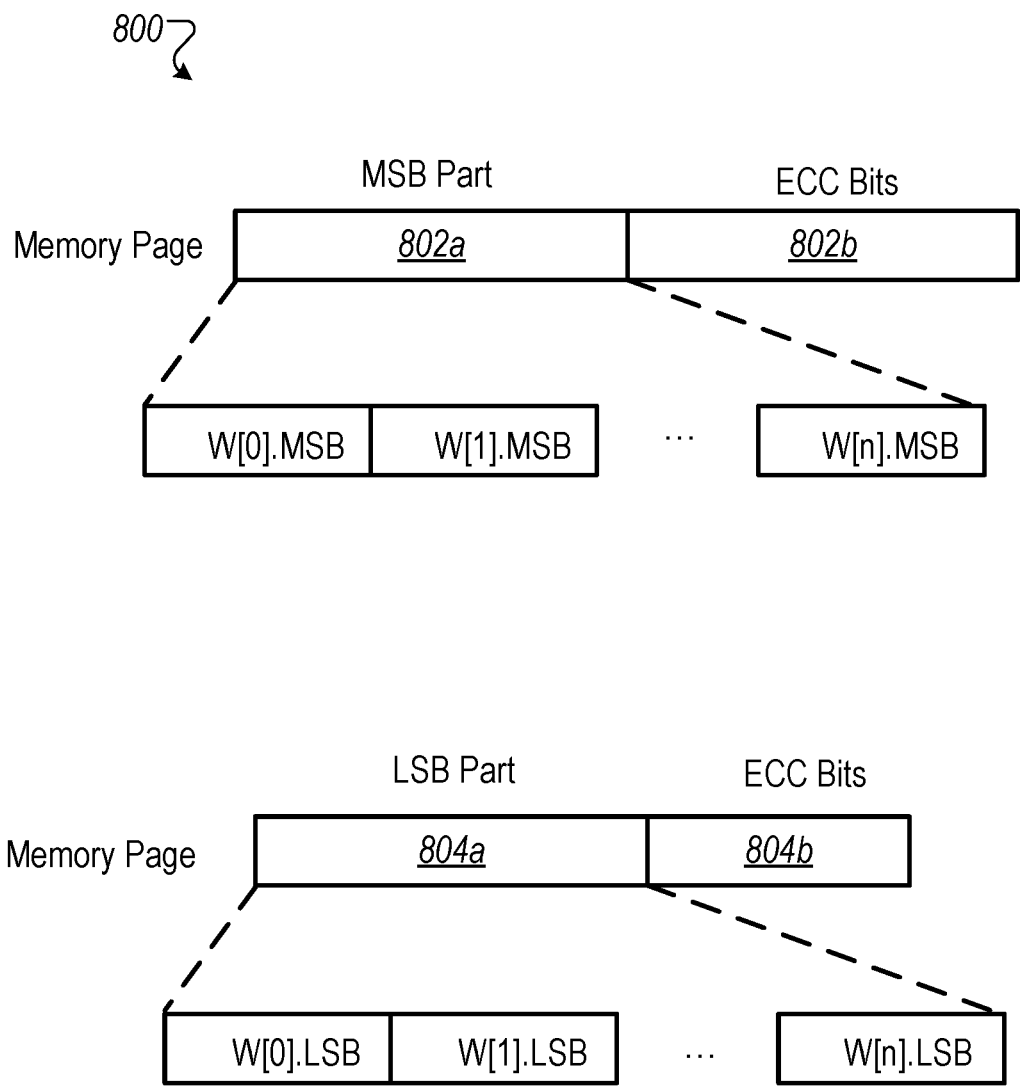
FIG. 8 illustrates an example of an AI-aware reliability management technique used by a storage controller.

FIG. 8 illustrates an example of an AI-aware reliability management technique 800 used by a storage controller. In some implementations, the AI-aware reliability management technique 800 is realized by the storage controller 222 to manage the memory locations in the AI data partition 226 of the storage device 220. In some implementations, an AI-aware reliability management component, e.g., AI-aware reliability management component 414, in the storage controller uses the AI-aware reliability management technique 800. The following sections describe the AI-aware reliability management technique 800 with respect to connection weights as data. However, storage of other types of AI data, e.g., neuron activation functions, can also use the reliability management technique 800.

In some implementations, using the AI-aware reliability management technique 800, a storage controller stores MSB portions of the values of weights corresponding to a neuron in a memory page that has a higher reliability, e.g., uses a strong ECC with more ECC bits. The storage controller stores the LSB portions of the values of the weights in a memory page that has a lower reliability, e.g., uses a weaker ECC with less ECC bits. This is the case, for example, in implementations where the MSBs of a weight are of greater importance than the LSBs of the weight, as described previously.

As an illustrative example, the storage controller stores the MSBs (e.g., the higher 16 bits, such as W[0].MSB, W[1].MSB W[n].MSB, of the 4-byte value of the weight) in a memory location 802a of a memory page that uses a strong ECC. The ECC bits corresponding to the MSBs is stored in the memory location 802b of the memory page. The storage controller stores the LSBs (e.g., the lower 16 bits, such as W[0].LSB, W[1].LSB . . . W[n].LSB, of the 4-byte value of the weight) in a memory location 804a of a second memory page that uses a weaker ECC, compared to the ECC used by the page with memory locations 802a and 802b. The ECC bits corresponding to the LSBs is stored in the memory location 804b of the second memory page. A greater number of ECC bits are stored in 802b, compared to the number of ECC bits stored in 804b. Accordingly, a higher reliability can be provided for the MSBs, compared to that provided for the LSBs. In this manner, the MSBs of all the weights of a neuron are collected and stored in the same page with a stronger ECC, while the LSBs of all the weights of the neuron are collected and stored in the different page with a weaker ECC.

In some implementations, the LSBs of a weight are of greater importance than the MSBs of the weight. In such cases, using the AI-aware reliability management technique 800, a storage controller stores LSB portions of the values of weights corresponding to a neuron in a memory page that has a higher reliability, e.g., uses a strong ECC with more ECC bits. The storage controller stores the MSB portions of the values of the weights in a memory page that has a lower reliability, e.g., uses a weaker ECC with less ECC bits.

The AI-aware reliability management component 414 uses additional techniques to provide reliability of the AI data stored in the AI data partition 226. For example, in some implementations, the AI-aware reliability management component 414 uses an AI-aware program verify technique. Using the AI-aware program verify technique, the MSBs of a weight are written with a higher number of iterations, compared to the LSBs of the weight. By using more program iterations, the MSBs obtain a narrower distribution of the memory cell threshold voltage (e.g., 0.2 volts wide), while the LSBs get a wider distribution of the memory cell threshold voltage (e.g., 0.6 volts wide) by using less program iterations.

In some implementations, the AI-aware reliability management component 414 uses an AI-aware wear leveling technique. Using the AI-aware wear leveling technique, the MSBs of a weight are written to a memory page in a memory block that has a lower number of program/erase (P/E) cycles, compared to a memory block to which the LSBs of the weight are written. For example, the MSBs of a weight are written to a memory block with a 100 P/E cycle, while the LSBs of the weight are written to a different memory block that has a 1000 P/E cycle. Since the robustness of a memory block decreases with increasing number of P/E cycles, the above technique ensures that MSBs of a weight (which are more important in some implementations, as described previously) are written to a memory block that can provide greater reliability, e.g., more robust to wear.

Figure 9A:
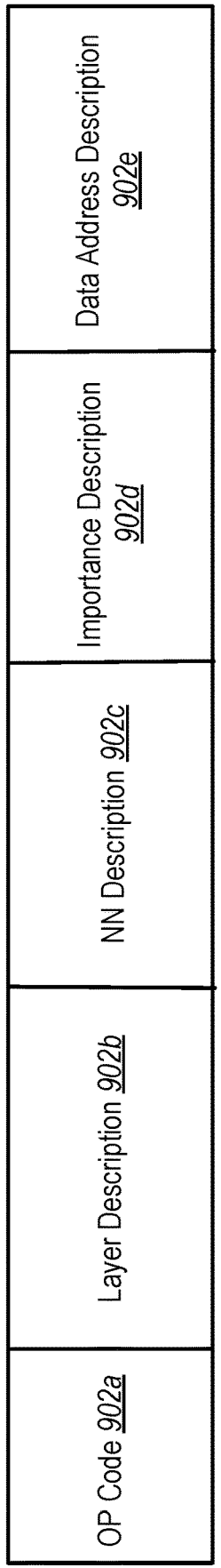
FIGS. 9A and 9B illustrate examples of AI command formats.
Figure 9B:
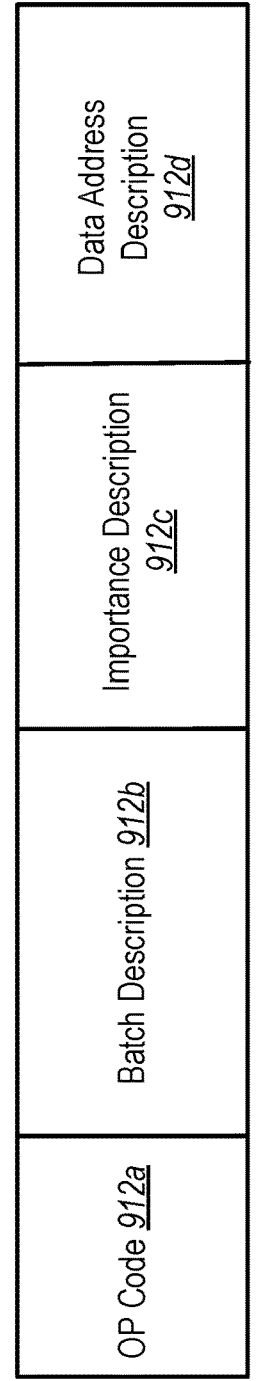

FIGS. 9A and 9B illustrate examples of AI command formats 900A and 900B, respectively. In some implementations, the command formats 900A and 900B are used by the processor 202 to send AI commands, e.g., AI_CMD (2), to the storage controller 222.

The command format 900A in FIG. 9A is used to send a single neural network (NN) access command, or a multiple NN access command. An NN access command is to access a single neuron and corresponding weights, while a multiple NN access command is for accessing multiple neurons and corresponding weights. The multiple neurons and corresponding weights can be stored in distributed locations in the memory. As shown, the command format 900A includes several fields, such as op code 902a, layer description 902b, NN description 902c, importance description 902d and data address description 902e.

The op code 902a specifies whether the AI command is a read command or a write command. In some implementations, the op code 902a field is 1 bit wide. However, other field widths are also possible in different implementations.

The layer description 902b differs between single NN access command and multiple NN access command. For a single NN access command, the layer description 902b provides a layer number that is to be accessed. For example, considering the ANN 100, the layer description 902b can specify layer L0, or layer L1, or layer L2. For a multiple NN access command, the layer description 902b provides a range of layers that are to be accessed. In some implementations, the layer description 902b field is 16 bits wide. However, other field widths are also possible in different implementations.

The NN description 902c differs between single NN access commands and multiple NN access commands. For a single NN access command, the NN description 902c identifies an ANN number that is to be accessed. For example, the AI data partition 226 in the storage device 220 can store data for multiple ANNs, including, e.g., ANN 100. The NN description 902c can provide an identifier for the ANN that is the target of the AI command, e.g., the NN description 902c can provide an identified for the ANN 100. For a multiple NN access command, the NN description 902c provides a range of ANNs that are to be accessed. In some implementations, the NN description 902c field is 16 bits wide. However, other field widths are also possible in different implementations.

The importance description 902d specifies which bits of the stored data are important bits. For example, as described previously, in some implementations, the MSBs are important, and this information can be specified by the importance description 902d. However, in some implementations, the LSBs are more important than the LSBs. In such cases, the importance description 902d specifies that the LSBs are the important bits. The various techniques adopted by the storage controller for AI-aware storage management that rely on the importance of the weights, e.g., the mapping table designs 500C-500E, the process 700, or the AI-aware reliability management technique 800, use the importance description 902d. The previous description is with respect to the MSBs being the important bits. The techniques are also applicable for implementations where the LSBs are the important bits. In some implementations, the importance description 902d field is 1 bit wide. However, other field widths are also possible in different implementations.

The data address description 902e provides pointers to the addresses of the memory locations, e.g. memory locations storing AI data in the AI data partition 226 that are to be accessed for performing the AI command. In some implementations, depending on the application, each pointer is 4 bits long, and there are M such pointers for M target memory locations (M is an integer>0). In such cases, data address description 902e field is 4*M bits wide. However, other field widths are also possible in different implementations. For example, in general, each pointer is L (L is an integer>0) bits long. With M such pointers for M target memory locations the data address description 902e field is L*M bits wide.

The command format 900B in FIG. 9B is used in some implementations to send a batch NN access command that is used by some applications. As shown, the command format 900B includes the fields op code 912a, batch description 912b, importance description 912c and data address description 912d. In such cases, the batch NN access command is used to access batch data, e.g., a number of neurons and corresponding weights that are stored in consecutive locations in the memory.

The op code 912a specifies whether the batch NN access AI command is a read command or a write command. In some implementations, the op code 912a field is 1 bit wide. However, other field widths are also possible in different implementations.

The batch description 912b provides a batch number that is to be accessed. The batch number refers to batch data that is to be accessed. As noted above, the batch data can be ANN data for a number of consecutive neurons and corresponding weights. In some implementations, the batch description

912b field is 16 bits wide. However, other field widths are also possible in different implementations.

The importance description 912c specifies which bits of the stored data are important bits, in a manner similar to that described for the importance description 902d field. In some implementations, the importance description 912c field is 1 bit wide. However, other field widths are also possible in different implementations.

The data address description 912d provides pointers to the addresses of the memory locations, e.g. memory locations storing AI data in the AI data partition 226 that are to be accessed for performing the AI command. In some implementations, each pointer is 4 bits long depending on the application, and there are M such pointers for M target memory locations (M is an integer>0). In such cases, data address description 912d field is 4*M bits wide. However, other field widths are also possible in different implementations. For example, for some applications, each pointer is L (L is an integer>0) bits long. With M such pointers for M target memory locations the data address description field 912d is L*M bits wide.

The disclosed and other examples can be implemented as one or more computer program products, for example, one or more modules of computer program instructions encoded on a computer readable medium for execution by, or to control the operation of, data processing apparatus. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform the functions described herein. The processes and logic flows can also be performed by, and apparatus can also be implemented as, special purpose logic circuitry, e.g., an FPGA or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. An apparatus comprising:
   one or more processors;
   non-transitory media storing instructions that, when executed by the one or more processors, are configured to cause the one or more processors to perform operations comprising:
   receiving, from an input device, input data for processing; and
   conditioned on determining that the input data corresponds to an artificial intelligence (AI) application:
   generating an AI command for performing one or more read or write operations for a memory device that is configured to (i) store data for AI applications processed by the one or more processors in a first storage partition of the memory device and (ii) store data for non-AI applications in a second storage partition of the memory device that is different from the first storage partition, the AI command including information specifying (i) one or more neurons of an artificial neural network corresponding to the AI application, the one or more neurons associated with the input data, wherein the input data includes weights corresponding to one or more of input connections or output connections of each of the one or more neurons, and (ii) an operational code indicating operations to be performed on the one or more neurons, wherein the operational code corresponds to one of (a) an individual read or write of a particular neuron in the artificial neural network, (b) multiple individual reads or writes of a plurality of neurons in the artificial neural network, or (c) a batch read or write of a batch of neurons in the artificial neural network, sending the AI command and the input data to a storage controller managing the memory device, wherein the one or more read or write operations for the memory device is performed by the storage controller using the operational code and the information included in the AI command, and receiving, from the storage controller, a result of the one or more read or write operations performed on the memory device; and the storage controller, wherein the storage controller is configured to perform operations comprising:

upon receiving the AI command from the one or more processors, obtaining, from the information included in the AI command, a first set of weights of one or more of input connections or output connections of a first neuron of the one or more neurons, and a second set of weights of one or more of input connections or output connections of a second neuron of the one or more neurons;

determining that the first neuron is accessed more frequently than the second neuron, and that the second neuron is accessed at a same rate as other neurons of the one or more neurons; and in response to the determination:

storing the first set of weights in a first area of the memory device that is used for logging, and storing the second set of weights in a second area of the memory device that is used for long-term storage different from logging.

2. The apparatus of claim 1, wherein the one or more processors to are configured to perform operations further comprising:

receiving, from the input device, second input data for processing; and conditioned on determining that the second input data corresponds to a non-AI application, accessing, by the one or more processors, one or more memory locations corresponding to the second input data in the memory device; and performing one or more read or write operations on the accessed one or more memory locations.

3. The apparatus of claim 1, wherein the storage controller is configured to perform operations comprising:

storing in a particular page or block of the memory device, the first set of weights associated with the first neuron, wherein the particular page of the memory device is configured to store weights associated with the first neuron.

4. The apparatus of claim 1, wherein the storage controller is configured to perform operations comprising:

dividing the first set of weights into a first subset and a second subset, storing the first subset in a same page or block in a first channel of the memory device, and storing the second subset in a same page or block in a second channel of the memory device.

5. The apparatus of claim 1, wherein the storage controller is configured to perform operations comprising:

determining that a first weight of the first set of weights has a first importance value and a second weight of the first set of weights has a second importance value, wherein the second importance value is less than the first importance value; and in response to the determination:

storing the first weight in a single level cell (SLC) in a first page of the memory device, and storing the second weight in one of a multi-level cell (MLC), a triple-level cell (TLC), or a quad-level cell (QLC) in a second page of the memory device.

6. The apparatus of claim 1, wherein the storage controller is configured to perform operations comprising:

determining that a first weight of the first set of weights has a first importance value and a second weight of the first set of weights has a second importance value, wherein the second importance value is less than the first importance value; and in response to the determination:

storing the first weight in a page or block of the memory device, and replicating the first weight in at least one additional page of the memory device, and storing the second weight in a page or block of the memory device without replication.

7. The apparatus of claim 1, wherein the storage controller is configured to perform operations comprising:

determining that a first weight of the first set of weights has a particular importance value;

comparing the particular importance value to a threshold importance value;

conditioned on a result of the comparison indicating that the particular importance value is greater than or equal to the threshold importance value, performing a full error correction check as part of the one or more read or write operations for the first weight; and conditioned on a result of the comparison indicating that the particular importance value is less than the threshold importance value, performing a partial error correction check as part of the one or more read or write operations for the first weight, wherein the partial error correction check is performed on one of the most significant bits corresponding to the first weight, or the least significant bits corresponding to the first weight.

8. The apparatus of claim 1, wherein the storage controller is configured to perform operations comprising:

determining a first portion and a second portion of each weight of the first set of weights, wherein the first portion and the second portion of each weight corresponds respectively to a first section and a second section of information bits corresponding to the weight, the first section and the second section characterized by corresponding relative importance values;

storing the first portions of the weights in the first set of weights in a first page of the memory device; and storing the second portions of the weights in the first set of weights in a second page of the memory device, wherein a first error check capability and a different second error check capability corresponds to the first page and the second page respectively.

9. The apparatus of claim 1, wherein the storage controller is configured to perform operations comprising:
determining a first portion and a second portion of each weight of the first set of weights, wherein the first portion and the second portion of each weight corresponds respectively to a first section and a second section of information bits corresponding to the weight, the first section and the second section characterized by corresponding relative importance values;
storing the first portions of the weights in the first set of weights in a first block of the memory device; and
storing the second portions of the weights in the first set of weights in a second block of the memory device,
wherein a number of program/erase cycles corresponding to the first block is different from a number of program/erase cycles corresponding to second first block.

10. The apparatus of claim 1, wherein the memory device includes one of a non-volatile memory (NVM) storage, a universal flash storage (UFS), a peripheral component interconnect express (PCIe) storage, a phase-change memory (PCM), a resistive random-access memory (ReRAM), a magnetoresistive random-access memory (MRAM), a dynamic random-access memory, a magnetic disk, or an optical disk.

11. A system comprising:
one or more processors, wherein each processor of the one or more processors is configured to perform first operations comprising:
receiving, from an input device, input data for processing;
conditioned on determining that the input data corresponds to an artificial intelligence (AI) application:
generating an AI command for performing one or more read or write operations for a particular memory device of one or more memory devices that are each configured to store data for a plurality of applications processed by the one or more processors, the plurality of applications including the AI application, the AI command including information specifying one or more neurons of an artificial neural network corresponding to the AI application, the one or more neurons associated with the input data, the AI command characterized by an operational code indicating operations to be performed on the one or more neurons,
sending the AI command and the input data to a storage controller managing the particular memory device, wherein the one or more read or write operations for the particular memory device is performed by the storage controller using the operational code and the information included in the AI command, and
receiving, from the storage controller, a result of the one or more read or write operations performed on the particular memory device,
wherein the input data includes weights corresponding to one or more of input connections or output connections of each of the one or more neurons; and
one or more storage controllers, wherein each storage controller of the one or more storage controllers manages a different memory device of the one or more memory devices, wherein each storage controller of the one or more storage controllers is configured to perform second operations comprising:
upon receiving an AI command and input data from a processor of the one or more processors, obtaining, from the information included in the AI command, a first set of weights corresponding to one or more of input connections or output connections of a first neuron of the one or more neurons and a second set of weights corresponding to one or more of input connections or output connections of a second neuron of the one or more neurons;
determining that the first neuron is accessed more frequently than the second neuron, and that the second neuron is accessed at a same rate as other neurons of the one or more neurons; and
in response to the determining, storing the first set of weights in a first section of the memory device used for storing frequently-accessed data, and storing the second set of weights in a different second section of the memory device used for long-term storage.

12. The system of claim 11, wherein the first operations further comprise:
conditioned on determining that the input data corresponds to a non-AI application included in the plurality of applications:
accessing one or more memory locations corresponding to the input data in a memory device of the one or more memory devices, and
performing one or more read or write operations on the accessed one or more memory locations.

13. The system of claim 11, the second operations comprise performing a memory access operation corresponding to the first set of weights associated with the first neuron, the memory access operation comprising:
storing in a particular page or block of the corresponding memory device, the first set of weights associated with the first neuron, wherein the particular page of the corresponding memory device is configured to store weights associated with the first neuron.

14. The system of claim 11, the second operations comprise performing a memory access operation corresponding to the first set of weights associated with the first neuron, the memory access operation comprising:
dividing the first set of weights into a first subset and a second subset,
storing the first subset in a same page or block in a first channel of the memory device, and
storing the second subset in a same page or block in a second channel of the memory device.

15. The system of claim 11, the second operations comprise performing a memory access operation corresponding to the first set of weights associated with the first neuron, the memory access operation comprising:
determining that a first weight of the first set of weights has a first importance value and a second weight of the first set of weights has a second importance value, wherein the second importance value is less than the first importance value; and
in response to the determination:
storing the first weight in a single level cell (SLC) in a first page of the memory device, and
storing the second weight in one of a multi-level cell (MLC), a triple-level cell (TLC), or a quad-level cell (QLC) in a second page of the memory device.

16. The system of claim 11, the second operations comprise performing a memory access operation corresponding to the first set of weights associated with the first neuron, the memory access operation comprising:
determining that a first weight of the first set of weights has a first importance value and a second weight of the first set of weights has a second importance value, wherein the second importance value is less than the first importance value; and in response to the determination:
storing the first weight in a page or block of the memory device, and replicating the first weight in at least one additional page of the memory device, and storing the second weight in a page or block of the memory device without replication.

17. The system of claim 11, wherein storing the first set of weights in a first section of the memory device comprises:
storing the first set of weights in an area of the memory device that is used for logging.

18. The system of claim 11, wherein the second operations comprise performing a memory access operation corresponding to the first set of weights associated with the first neuron, the memory access operation comprising:
determining that a first weight of the first set of weights has a particular importance value;
comparing the particular importance value to a threshold importance value;
conditioned on a result of the comparison indicating that the particular importance value is greater than or equal to the threshold importance value, performing a full error correction check as part of the one or more read or write operations for the first weight; and
conditioned on a result of the comparison indicating that the particular importance value is less than the threshold importance value, performing a partial error correction check as part of the one or more read or write operations for the first weight, wherein the partial error correction check is performed on one of the most significant bits corresponding to the first weight, or the least significant bits corresponding to the first weight.

19. The system of claim 11, wherein the second operations comprise performing a memory access operation corresponding to the first set of weights associated with the first neuron, the memory access operation comprising:
determining a first portion and a second portion of each weight of the first set of weights, wherein the first portion and the second portion of each weight corresponds respectively to a first section and a second section of information bits corresponding to the weight, the first section and the second section characterized by corresponding relative importance values;
storing the first portions of the weights in the first set of weights in a first page of the memory device; and
storing the second portions of the weights in the first set of weights in a second page of the memory device,
wherein a first error check capability and a different second error check capability corresponds to the first page and the second page respectively.

20. The system of claim 11, wherein a memory device of the one or more memory devices includes one of a non-volatile memory (NVM) storage, a universal flash storage (UFS), a peripheral component interconnect express (PCIe) storage, a phase-change memory (PCM), a resistive random-access memory (ReRAM), a magnetoresistive random-access memory (MRAM), a dynamic random-access memory, a magnetic disk, or an optical disk.

21. A method comprising:
receiving, at a processor from an input device, input data for processing;
conditioned on determining that the input data corresponds to an artificial intelligence (AI) application:
generating, by the processor, an AI command for performing one or more read or write operations for a memory device that is configured to (i) store data for AI applications processed by the processor in a first storage partition of the memory device and (ii) store data for non-AI applications in a second storage partition of the memory device that is different from the first storage partition, the AI command including information specifying (i) one or more neurons of an artificial neural network corresponding to the AI application, the one or more neurons associated with the input data, and (ii) an operational code indicating operations to be performed on the one or more neurons, wherein the input data includes weights corresponding to one or more of input connections or output connections of each of the one or more neurons,
sending, by the processor, the AI command and the input data to a storage controller managing the memory device, wherein the one or more read or write operations for the memory device is performed by the storage controller using the operational code and the information included in the AI command, the one or more read or write operations comprising:
obtaining from the information included in the AI command, a first set of weights one or more of input connections or output connections of a first neuron of the one or more neurons and a second set of weights of one or more of input connections or output connections of a second neuron of the one or more neurons,
performing a memory access operation involving the first set of weights associated with the first neuron on the memory device,
upon determining that the first neuron is accessed more frequently than the second neuron, and that the second neuron is accessed at a same rate as other neurons of the one or more neurons, storing the first set of weights associated with the first neuron in a first area of the memory device that is used for logging, and storing the second set of weights in a second area of the memory device that is used for long-term storage different from logging, and
receiving, at the processor from the storage controller, a result of the one or more read or write operations performed on the memory device; and
conditioned on determining that the input data corresponds to a non-AI application:
accessing, by the processor, one or more memory locations corresponding to the input data in the memory device, and
performing, by the processor, one or more read or write operations on the accessed one or more memory locations.

22. The method of claim 21, wherein performing the memory access operation comprises one of:
storing in a particular page or block of the memory device, the first set of weights associated with the first neuron, wherein the particular page of the memory device is configured to store weights associated with the first neuron; or
dividing the first set of weights into a first subset and a second subset,
storing the first subset in a same page or block in a first channel of the memory device, and
storing the second subset in a same page or block in a second channel of the memory device.

23. The method of claim 21, wherein performing the memory access operation comprises:

determining that a first weight of the first set of weights has a first importance value and a second weight of the first set of weights has a second importance value, wherein the second importance value is less than the first importance value; and in response to the determination:
storing the first weight in a single level cell (SLC) in a first page of the memory device, and
storing the second weight in one of a multi-level cell (MLC), a triple-level cell (TLC), or a quad-level cell (QLC) in a second page of the memory device.

24. The method of claim 21, wherein performing the memory access operation comprises:
determining that a first weight of the first set of weights has a first importance value and a second weight of the first set of weights has a second importance value, wherein the second importance value is less than the first importance value; and
in response to the determination:
storing the first weight in a page or block of the memory device, and replicating the first weight in at least one additional page of the memory device, and
storing the second weight in a page or block of the memory device without replication.

25. The method of claim 21, wherein performing the memory access operation comprises:
determining that a first weight of the first set of weights has a particular importance value;
comparing the particular importance value to a threshold importance value;
conditioned on a result of the comparison indicating that the particular importance value is greater than or equal to the threshold importance value, performing a full error correction check as part of the one or more read or write operations for the first weight; and
conditioned on a result of the comparison indicating that the particular importance value is less than the threshold importance value, performing a partial error correction check as part of the one or more read or write operations for the first weight, wherein the partial error correction check is performed on one of the most significant bits corresponding to the first weight, or the least significant bits corresponding to the first weight.

26. The method of claim 21, wherein performing the memory access operation comprises:
determining a first portion and a second portion of each weight of the first set of weights, wherein the first portion and the second portion of each weight corresponds respectively to a first section and a second section of information bits corresponding to the weight, the first section and the second section characterized by corresponding relative importance values;
storing the first portions of the weights in the first set of weights in a first page of the memory device; and
storing the second portions of the weights in the first set of weights in a second page of the memory device,
wherein a first error check capability and a different second error check capability corresponds to the first page and the second page respectively.

27. The method of claim 21, wherein performing the memory access operation comprises:
determining a first portion and a second portion of each weight of the first set of weights, wherein the first portion and the second portion of each weight corresponds respectively to a first section and a second section of information bits corresponding to the weight, the first section and the second section characterized by corresponding relative importance values;
storing the first portions of the weights in the first set of weights in a first block of the memory device; and
storing the second portions of the weights in the first set of weights in a second block of the memory device,
wherein a number of program/erase cycles corresponding to the first block is different from a number of program/erase cycles corresponding to second first block.

* * * * *